US010157541B2

(12) United States Patent
Okazaki et al.

(10) Patent No.: US 10,157,541 B2
(45) Date of Patent: Dec. 18, 2018

(54) VEHICLE SURVEILLANCE SYSTEM, VEHICLE SURVEILLANCE METHOD, AND PROGRAM

(71) Applicant: MITSUBISHI HEAVY INDUSTRIES MACHINERY SYSTEMS, LTD., Kobe-shi, Hyogo (JP)

(72) Inventors: Takuma Okazaki, Tokyo (JP); Takeshi Fukase, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 15/512,197

(22) PCT Filed: Sep. 9, 2014

(86) PCT No.: PCT/JP2014/074915

§ 371 (c)(1),
(2) Date: Mar. 17, 2017

(87) PCT Pub. No.: WO2016/042670

PCT Pub. Date: Mar. 24, 2016

(65) Prior Publication Data

US 2017/0278389 A1 Sep. 28, 2017

(51) Int. Cl.
*G08G 1/017* (2006.01)
*G08G 1/054* (2006.01)
(Continued)

(52) U.S. Cl.
CPC ........... *G08G 1/0175* (2013.01); *G07C 5/008* (2013.01); *G07C 5/0866* (2013.01); *G08G 1/054* (2013.01); *G08G 1/137* (2013.01); *G08G 1/205* (2013.01)

(58) Field of Classification Search
CPC ........ G08G 1/015; G08G 1/054; G08G 1/137; G08G 1/0125; G08G 1/017; G08G 1/205;
(Continued)

(56) References Cited

U.S. PATENT DOCUMENTS

2005/0258978 A1* 11/2005 Hartinger ............... G01C 21/26 340/928
2012/0329433 A1* 12/2012 Fogarty ................ G07B 15/063 455/414.1

(Continued)

FOREIGN PATENT DOCUMENTS

JP 9-319904 A 12/1997
JP 2002-251641 A 9/2002

(Continued)

OTHER PUBLICATIONS

Translation of JP2006190198A.*

(Continued)

*Primary Examiner* — Brian Zimmerman
*Assistant Examiner* — Sara Samson
(74) *Attorney, Agent, or Firm* — Kanesaka Berner and Partners, LLP

(57) ABSTRACT

A vehicle surveillance system includes: a photographing unit configured to photograph a target vehicle; a positional information acquisition unit configured to acquire positional information indicating a position of the photographing unit; a surveillance information generation unit configured to extract a vehicle number from an image acquired by the photographing unit and generate surveillance information on the basis of at least the vehicle number and the positional information; and a surveillance information output unit configured to output the surveillance information generated by the surveillance information generation unit. The photographing unit, the positional information acquiring unit, the surveillance information generation unit, and the surveillance information output unit are installed in a mobile surveillance vehicle.

8 Claims, 13 Drawing Sheets

(51) Int. Cl.

| | |
|---|---|
| ***G08G 1/137*** | (2006.01) |
| ***G08G 1/00*** | (2006.01) |
| ***G07C 5/00*** | (2006.01) |
| ***G07C 5/08*** | (2006.01) |

(58) Field of Classification Search

CPC .... G07B 15/00; G07B 15/06; G06Q 20/3224; G07C 5/008; G07C 5/0866

See application file for complete search history.

(56) References Cited

U.S. PATENT DOCUMENTS

2013/0201039 A1* 8/2013 Gartner .................. G08G 1/015
340/989
2014/0375807 A1* 12/2014 Muetzel ................... H04N 7/18
348/148
2015/0154578 A1* 6/2015 Aggarwal ............ G06Q 20/145
705/13
2017/0237950 A1* 8/2017 Araya .................... H04N 7/188
386/223

FOREIGN PATENT DOCUMENTS

| | | | | |
|---|---|---|---|---|
| JP | 2002251641 | A | * | 9/2002 |
| JP | 2006-190198 | A | | 7/2006 |
| JP | 2006190198 | A | * | 7/2006 |
| JP | 4494983 | B2 | | 6/2010 |
| JP | 2013-200656 | A | | 10/2013 |
| JP | 2013-210975 | A | | 10/2013 |
| WO | 2013/190566 | A2 | | 12/2013 |

OTHER PUBLICATIONS

International Search Report in International Application No. PCT/JP2014/014915, dated Dec. 16, 2014.

Written Opinion in International Application No. PCT/JP2014/074915, dated Dec. 16, 2014.

* cited by examiner

VEHICLE SURVEILLANCE SYSTEM, VEHICLE SURVEILLANCE METHOD, AND PROGRAM

RELATED APPLICATIONS

The present application is a National Phase of International Application Number PCT/JP2014/074915, filed Sep. 19, 2014.

TECHNICAL FIELD

The present invention relates to a vehicle surveillance system, a vehicle surveillance method, and a program.

BACKGROUND ART

An on-board unit that orients a location of a vehicle on the basis of signals received from satellites is known. The on-board unit performs charging processing when it is determined that a corresponding vehicle travels on a toll road on the basis of acquired positional information (for example, see Patent Literature 1). In such a charging system, entrance and exit management is not performed at an entrance or an exit of the toll road but the charging processing is performed on a target vehicle travelling in a charging area. Accordingly, when a target vehicle travels in a charging area but an on-board unit thereof is detached therefrom at a time of performing the charging processing, a toll cannot be collected. When an on-board unit of a vehicle traveling in a charging area is replaced with an on-board unit of another vehicle, a regular fee cannot be collected.

A technique of recognizing a vehicle number from an image acquired by photographing a vehicle traveling on a toll road and identifying the vehicle traveling on the toll road is known (for example, see Patent Literature 2). A violating vehicle which is travelling on a toll road but intends to avoid payment of a regular fee can be identified using this technique.

CITATION LIST

Patent Literature

[Patent Literature 1]

Japanese Unexamined Patent Application, First Publication No. H09-319904

[Patent Literature 2]

Japanese Patent No. 4494983

SUMMARY OF INVENTION

Technical Problem

However, in a system in which entrance and exit management is not performed at an entrance or an exit of a toll road or the like, a camera photographing a vehicle, a road-side unit communicating with an on-board unit, and the like have to be installed at a plurality of positions of the toll road to crack-down on a violating vehicle.

The present invention provides a vehicle surveillance system, a vehicle surveillance method, and a program that enables a construction of a system for surveilling a vehicle easy.

Solution to Problem

According to an aspect of the present invention, a vehicle surveillance system (1, 1A) includes: a photographing unit (20) configured to photograph a target vehicle (400); a positional information acquisition unit (301) configured to acquire positional information indicating a position of the photographing unit; a surveillance information generation unit (304) configured to extract a vehicle number from an image acquired by the photographing unit and generate surveillance information on the basis of at least the vehicle number and the positional information; and a surveillance information output unit (305) configured to output the surveillance information generated by the surveillance information generation unit, and the photographing unit, the positional information acquiring unit, the surveillance information generation unit, and the surveillance information output unit are installed in a mobile surveillance vehicle (100).

According to this configuration, it is possible to photograph a target vehicle at an arbitrary position and to generate surveillance information. Accordingly, it is possible to increase the number of surveillance points using a single device and to suppress the number of devices which are prepared as a whole.

According to the aspect of the present invention, the vehicle surveillance system may further include a violating vehicle identification unit (605) configured to identify a violating vehicle on the basis of the surveillance information and information on charging from an on-board unit of the target vehicle.

According to this configuration, it is possible to crack-down on whether a target vehicle photographed by the photographing unit pays an appropriate fee. It is also possible to crack-down on whether a target vehicle for which an appropriate fee could not be charged travels in a charging area.

According to the aspect of the present invention, the violating vehicle identification unit may identify the violating vehicle on the basis of surveillance information including the positional information which is included in an actual surveillance area inside a predetermined charging area among multiple pieces of the surveillance information.

According to this configuration, it is possible to prevent a vehicle other than a charging target from being erroneously identified as a violating vehicle on the basis of surveillance information acquired from an acquired image in the vicinity of a boundary of a charging area.

According to the aspect of the present invention, the violating vehicle identification unit may determine that the target vehicle is the violating vehicle when a newest ignition state of the target vehicle is an OFF state and a position of the target vehicle when the ignition state is switched to the OFF state and a photographing position of a newest image in which the photographing unit photographs the target vehicle do not match each other.

According to this configuration, a target vehicle traveling without broadcasting a turning-on of an ignition thereof after the ignition is turned off can be determined to be a violating vehicle. There is a high possibility of such a vehicle traveling with a target vehicle on-board unit detached therefrom.

According to the aspect of the present invention, the violating vehicle identification unit may determine that the target vehicle is the violating vehicle when the newest ignition state of the target vehicle is an ON state and charging processing has not been performed within a predetermined period.

According to this configuration, the target vehicle 400 having a high possibility of exiting from a charging area without performing charging processing can be determined to be a violating vehicle.

According to the aspect of the present invention, the violating vehicle identification unit may identify the violating vehicle on the basis of information on charging of the charging processing and the surveillance information when the charging processing is performed before acquiring the surveillance information in a charging area in which the surveillance information is acquired.

According to this configuration, it is possible to determine whether a vehicle of which the surveillance information is acquired is a violating vehicle on the basis of the surveillance information acquired after charging processing is performed. Accordingly, even when a vehicle performing appropriate charging processing becomes a violating vehicle after the charging processing, it is possible to crack-down on the vehicle.

According to the aspect of the present invention, the vehicle surveillance system may further include a surveillance timing control unit (302) configured to: instruct the photographing unit to start photographing when it is determined that the surveillance vehicle has moved a predetermined distance or more or a predetermined time or more into the predetermined charging area from a boundary part of the charging area on the basis of the positional information; and instruct the photographing unit to end photographing when it is determined that the surveillance vehicle in the charging area has approached the boundary part on the basis of the positional information.

According to this configuration, it is possible to prevent a target vehicle from being photographed in the vicinity of a boundary of a charging area and thus to prevent a vehicle other than a charging target from being erroneously identified as a violating vehicle.

According to the aspect of the present invention, the positional information acquisition unit may acquire positional information which is generated on the basis of a signal received from a satellite.

According to this configuration, it is possible to simply acquire a current position at which surveillance information is acquired.

According to another aspect of the present invention, a vehicle surveillance method which is performed by a vehicle surveillance system installed in a mobile surveillance vehicle includes: a photographing step of photographing a target vehicle; a positional information acquisition step of acquiring positional information indicating a position at which the target vehicle is photographed; a surveillance information generation step of extracting a vehicle number from an image acquired in the photographing step and generating surveillance information on the basis of at least the vehicle number and the positional information; and a surveillance information output step of outputting the surveillance information generated in the surveillance information generation step.

According to another aspect of the present invention, a program causing a computer to perform: a photographing step of photographing a target vehicle; a positional information acquisition step of acquiring positional information indicating a position at which the target vehicle is photographed; a surveillance information generation step of extracting a vehicle number from an image acquired in the photographing step and generating surveillance information on the basis of at least the vehicle number and the positional information; and a surveillance information output step of outputting the surveillance information generated in the surveillance information generation step.

Advantageous Effects of Invention

It is possible to enable a construction of a system for surveilling a vehicle easy.

DESCRIPTION OF EMBODIMENTS

Hereinafter, an example of a vehicle surveillance system 1 according to an embodiment of the present invention will be described.

(Entire Configuration)

Figure 1:
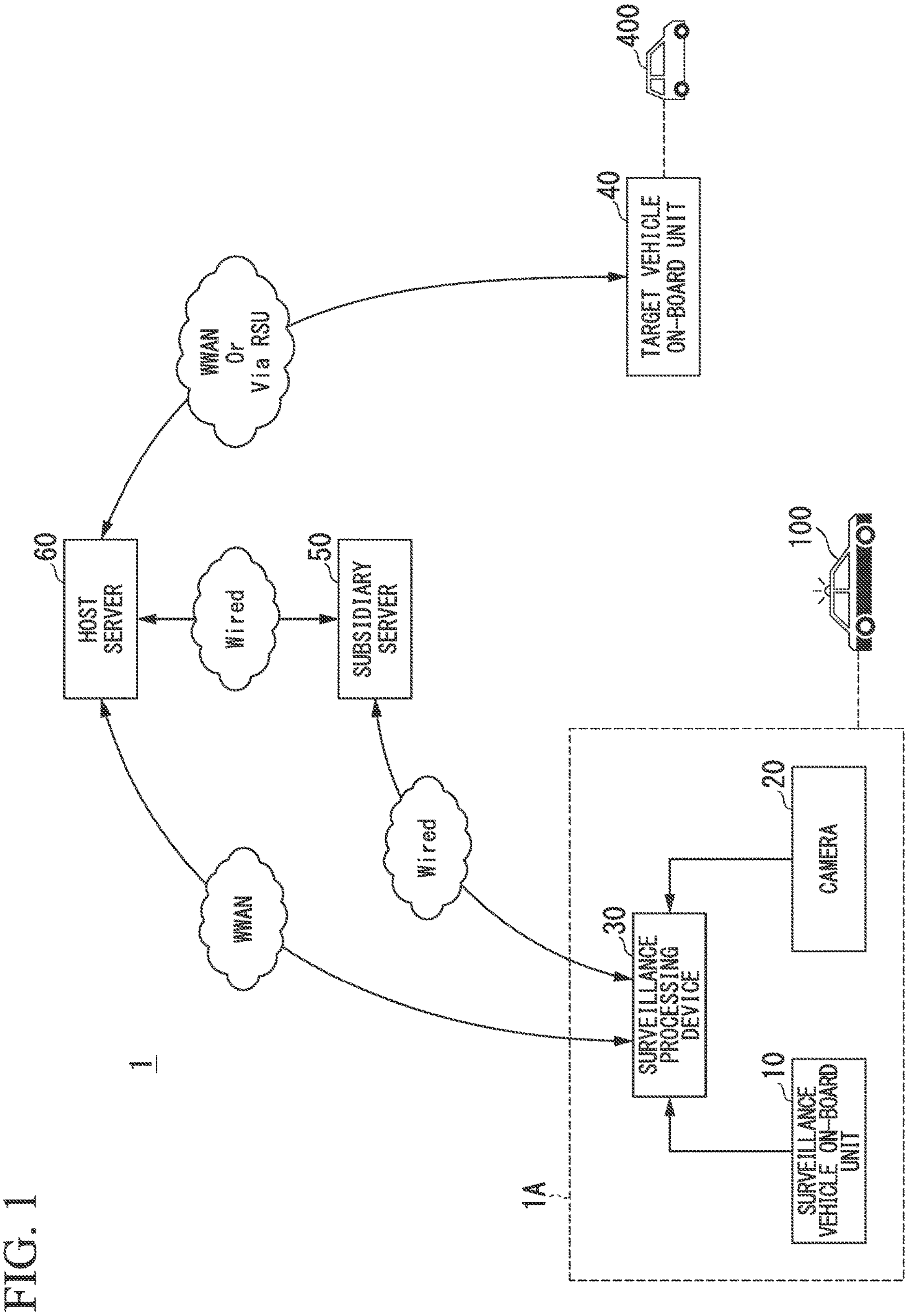
FIG. 1 is a schematic diagram illustrating an example of a vehicle surveillance system 1 according to an embodiment of the present invention.

FIG. 1 is a schematic diagram illustrating an example of the vehicle surveillance system 1 according to an embodiment of the present invention. As illustrated in FIG. 1, the vehicle surveillance system 1 includes a surveillance vehicle on-board unit 10, a camera 20, a surveillance processing device 30, a target vehicle on-board unit 40, a subsidiary server 50, and a host server 60.

In the embodiment, the surveillance vehicle on-board unit 10, the camera 20, and the surveillance processing device 30 are mounted on a mobile surveillance vehicle 100 and constitute a vehicle-mounted surveillance system 1A. The target vehicle on-board unit 40 is mounted on a target vehicle 400 which is a surveillance target.

The surveillance processing device 30 is connected to the host server 60, for example, via a wireless wide area network (WWAN). For example, a personal computer can be applied as the surveillance processing device 30.

The target vehicle 400 is connected to the host server 60, for example, a wireless wide area network (WWAN) or a road-side unit (RSU) such as a road-side antenna.

The subsidiary server 50 is connected to the surveillance processing device 30 and the host server 60, for example, via a wired connection such as a cable or a wireless wide area network (WWAN).

An example of a charging type to which the vehicle surveillance system 1 according to the embodiment can be applied will be described below.

A charging type in which a toll is charged when a vehicle passes through a predetermined charging point is referred to as point charging.

A charging type in which a toll is charged when a vehicle passes through a predetermined segment is referred to as segment charging. A segment refers to each of a plurality of areas (segments) into which a predetermined area on a map is divided. In the segment charging, a toll may be determined for each of the one or more segments, or a toll corresponding to a moving route may be determined when a vehicle moves from a segment to another segment. In the embodiment, in the segment charging, when an ignition of the target vehicle 400 is turned off in a segment which is a charging target, a toll corresponding to a distance accumulated up to that time is charged. A charging timing of a toll is a time at which an ignition is turned off and a time at which a target vehicle exits from a segment that is a charging target.

It is assumed that an area in a segment that is a charging target is a surveillance target of the vehicle surveillance system 1 and is hereinafter referred to as a charging area or a surveillance area. In the segment charging, a part of a road in the charging area may be set as a charging target and the other part of the road thereof may be set as a non-charging target.

In the point charging, the surveillance vehicle 100 preferably stops at a position at which the target vehicle 400 passing through a charging point can be photographed but may travel on a road that is the charging target.

In the segment charging, the surveillance vehicle 100 may stop at a position at which the target vehicle 400 passing through a boundary part of a segment can be photographed or may surveil the target vehicle 400 that is traveling in the surveillance area in the segment.

(Configuration of Surveillance Vehicle On-Board Unit 10)

Figure 2:
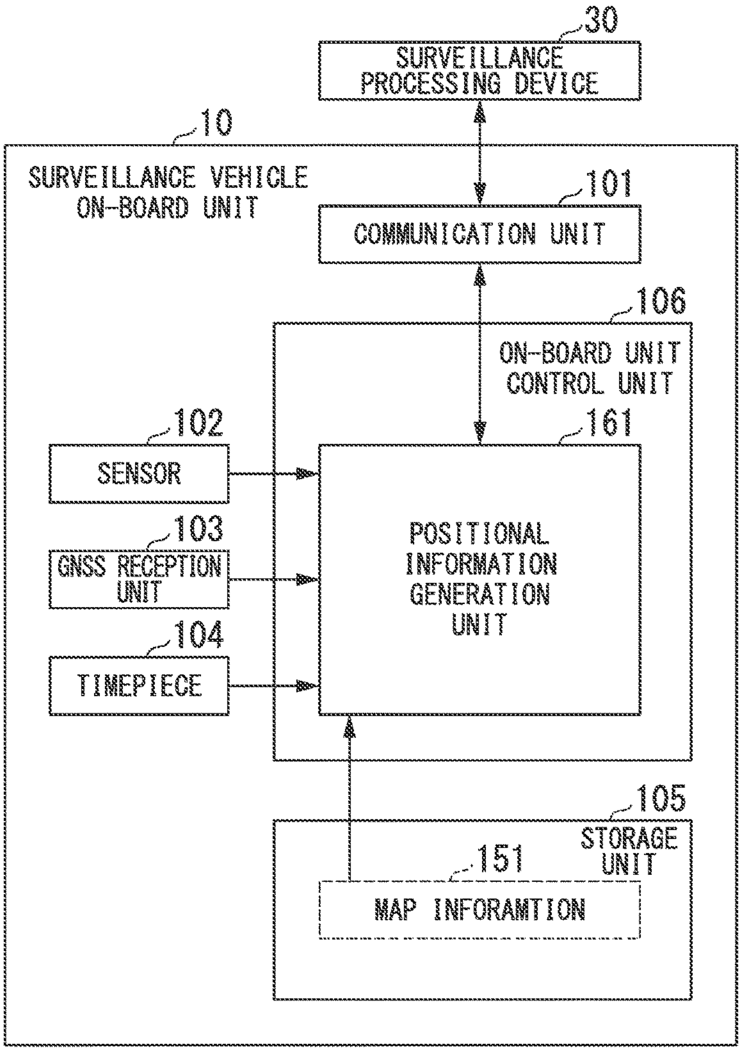
FIG. 2 is a diagram illustrating an example of a configuration of a surveillance vehicle on-board unit 10.

The configuration of the surveillance vehicle on-board unit 10 will be described below in detail with reference to FIG. 2. FIG. 2 is a diagram illustrating an example of the configuration of the surveillance vehicle on-board unit 10.

As illustrated in FIG. 2, the surveillance vehicle on-board unit 10 includes a communication unit 101, a sensor 102, a GNSS reception unit 103, a timepiece 104, a storage unit 105, and an on-board unit control unit 106. The surveillance vehicle on-board unit 10 detects a current position of the surveillance vehicle 100 and outputs positional information of the detected current position to the surveillance processing device 30.

The communication unit 101 is connected to the surveillance processing device 30 by, for example, wired connection or short-range radio communication and outputs positional information to the surveillance processing device 30.

The sensor 102 includes an acceleration sensor, a vehicle speed sensor, and a gyro sensor, detects a state change of a vehicle on which the surveillance vehicle on-board unit 10 is mounted, and outputs the detection result to the on-board unit control unit 106.

The GNSS reception unit 103 receives radio waves from satellites and outputs information extracted from the radio waves to the on-board unit control unit 106.

The timepiece 104 outputs information indicating a current date and time (hereinafter referred to as date and time information) to the on-board unit control unit 106.

The storage unit 105 stores map information 151. The map information 151 includes link IDs for identifying roads. The links are connected to each other at a node corresponding to an intersection or the like, and the map information 151 includes node IDs for identifying nodes.

The on-board unit control unit 106 is, for example, a central processing unit (CPU) and comprehensively controls the surveillance vehicle on-board unit 10. The surveillance vehicle on-board unit 10 includes a positional information generation unit 161 as a functional unit which functions by causing the on-board unit control unit 106, which is the CPU, to execute a program. Some or all of the functional units may be a hardware functional unit such as a large scale integration (LSI) or an application specific integrated circuit (ASIC).

The positional information generation unit 161 calculates a current position (for example, coordinate values on the Earth) of the surveillance vehicle 100 on which the surveillance vehicle on-board unit 10 is mounted on the basis of information from the sensor 102 or the GNSS reception unit 103 and captures a traveling position thereof The positional information generation unit 161 captures a link ID of a road on which the vehicle is traveling, for example, by comparing the current position of the vehicle with the map information 151 stored in the storage unit 105.

The positional information generation unit 161 outputs information indicating the captured traveling position and a data and time at which the vehicle is travelling at the traveling position (hereinafter referred to as positional information) to the surveillance processing device 30 via the communication unit 101.

(Configuration of Surveillance Processing Device 30)

Figure 3:
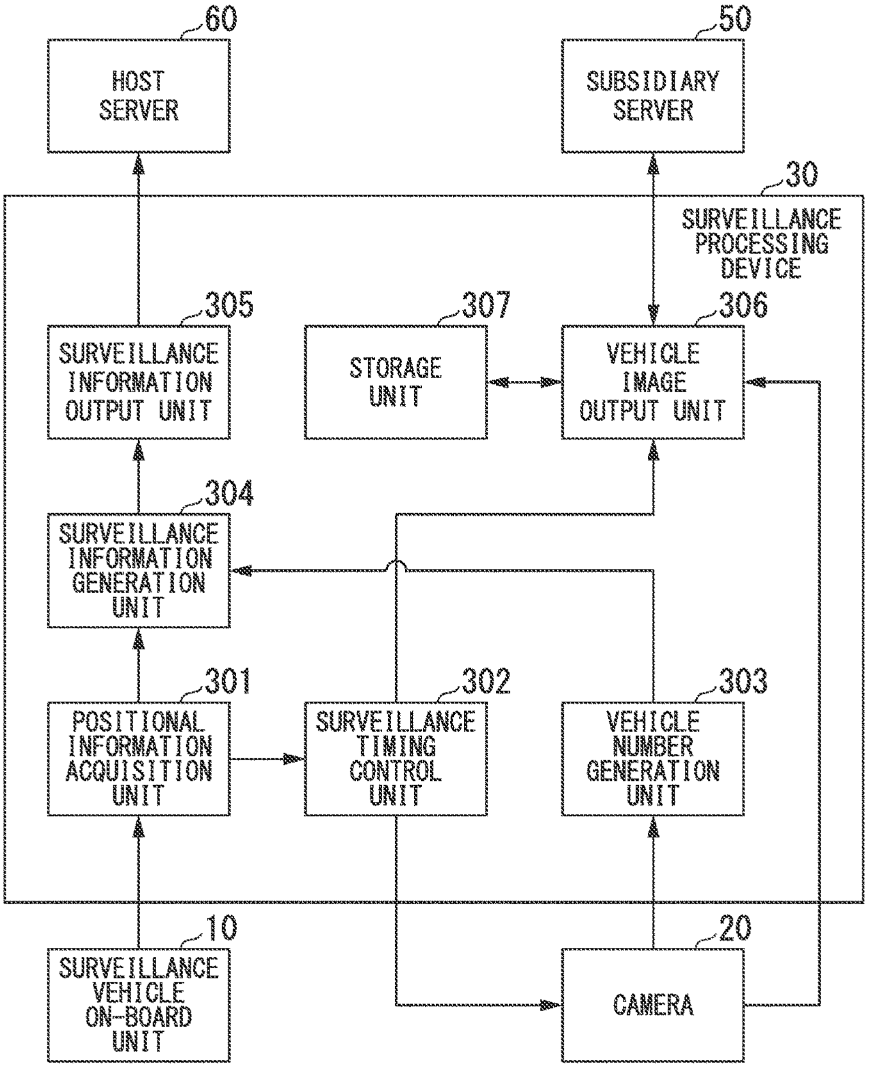
FIG. 3 is a diagram illustrating an example of a configuration of a surveillance processing device 30.

The configuration of the surveillance processing device 30 will be described below in detail with reference to FIG. 3. FIG. 3 is a diagram illustrating an example of the configuration of the surveillance processing device 30.

As illustrated in FIG. 3, the surveillance processing device 30 includes a positional information acquisition unit 301, a surveillance timing control unit 302, a vehicle number generation unit 303, a surveillance information generation unit 304, a surveillance information output unit 305, and a vehicle image output unit 306. Some or all of functional units may be functional units which function by causing a CPU, an LSI, or an ASIC to execute a program.

The positional information acquisition unit 301 acquires positional information from the surveillance vehicle on-board unit 10 and outputs the acquired positional information to the surveillance timing control unit 302 and the surveillance information generation unit 304.

The surveillance timing control unit 302 determines a position of the surveillance vehicle 100 in a surveillance area on the basis of the positional information and determines a start and end of surveillance processing with reference to schedule data on the basis of the position of the surveillance vehicle 100. The surveillance timing control unit 302 instructs the camera 20 to start photographing when the start of the surveillance processing is determined, and instructs the camera to end the photographing when the end of the surveillance processing is determined.

The schedule data is data of a surveillance schedule in which a position and a time at which the surveillance vehicle 100 performs surveillance are defined. The schedule data includes a schedule in which point charging is controlled or a schedule in which segment charging is controlled. An operator operating the surveillance processing device 30 selects a type of charging crack-down which will be performed and determines a schedule table which is referred to by the surveillance timing control unit 302.

For example, when point charging is controlled, the fact that the surveillance vehicle performs surveillance from a predetermined start time to a predetermined end time in a state in which the surveillance vehicle is stopped at a charging point is defined in the schedule table. In this case, the surveillance timing control unit 302 determines that the surveillance processing has started when the positional information detected by the surveillance vehicle on-board unit 10 indicates the charging point and the start time arrives. The surveillance timing control unit 302 notifies a surveillant to stop at the charging point via a display unit (not illustrated) during surveillance and determines that the surveillance processing has ended on a condition that the end time arrives.

When the segment charging is controlled, the fact that the surveillance vehicle performs surveillance while traveling on a defined road in the charging area during a defined time period is defined in the schedule table. In this case, the surveillance timing control unit 302 determines that the surveillance processing has started when it is determined that the surveillance vehicle 100 has entered a predetermined surveillance area by a predetermined quantity or more from a predetermined boundary part of the surveillance area. The surveillance timing control unit 302 determines that the surveillance processing has ended when it is determined that the surveillance vehicle 100 in the surveillance area approaches the boundary part.

The vehicle number generation unit 303 extract a vehicle number of the target vehicle 400 from an image of the target vehicle 400 photographed by the camera 20, for example, using an optical character recognition (OCR) technique. The vehicle number generation unit 303 outputs identification information of the image from which the vehicle number is extracted (hereinafter referred to as an image ID) and the extracted vehicle number in correlation with each other to the surveillance information generation unit 304.

When the vehicle number, an image ID, and a photographing date and time are input from the vehicle number generation unit 303, the surveillance information generation unit 304 generates surveillance information including the input vehicle number, image ID, and photographing date and time and newest positional information input from the positional information acquisition unit 301, and outputs the generated surveillance information to the surveillance information output unit 305.

When the surveillance information is not generated on the basis of the positional information acquired from the positional information acquisition unit 301, the surveillance information generation unit 304 outputs only the positional information to the host server 60 via the surveillance information output unit 305.

The surveillance information output unit 305 outputs the surveillance information generated by the surveillance information generation unit 304 to the host server 60.

The vehicle image output unit 306 stores a plurality of pieces of image data of the target vehicle 400 photographed by the camera 20 in the storage unit 307. When the surveillance processing in the surveillance area has ended, the vehicle image output unit 306 may output all of the image data stored in the storage unit 307 to the subsidiary server 50. A case in which the surveillance processing in the surveillance area has ended may be a time at which the surveillance timing control unit 302 determines that the surveillance processing using a single surveillance camera has ended or a time at which it is determined by the schedule data that the surveillance processing in all of the surveillance areas of a day has ended.

(Configuration of Target Vehicle On-Board Unit 40)

Figure 4:
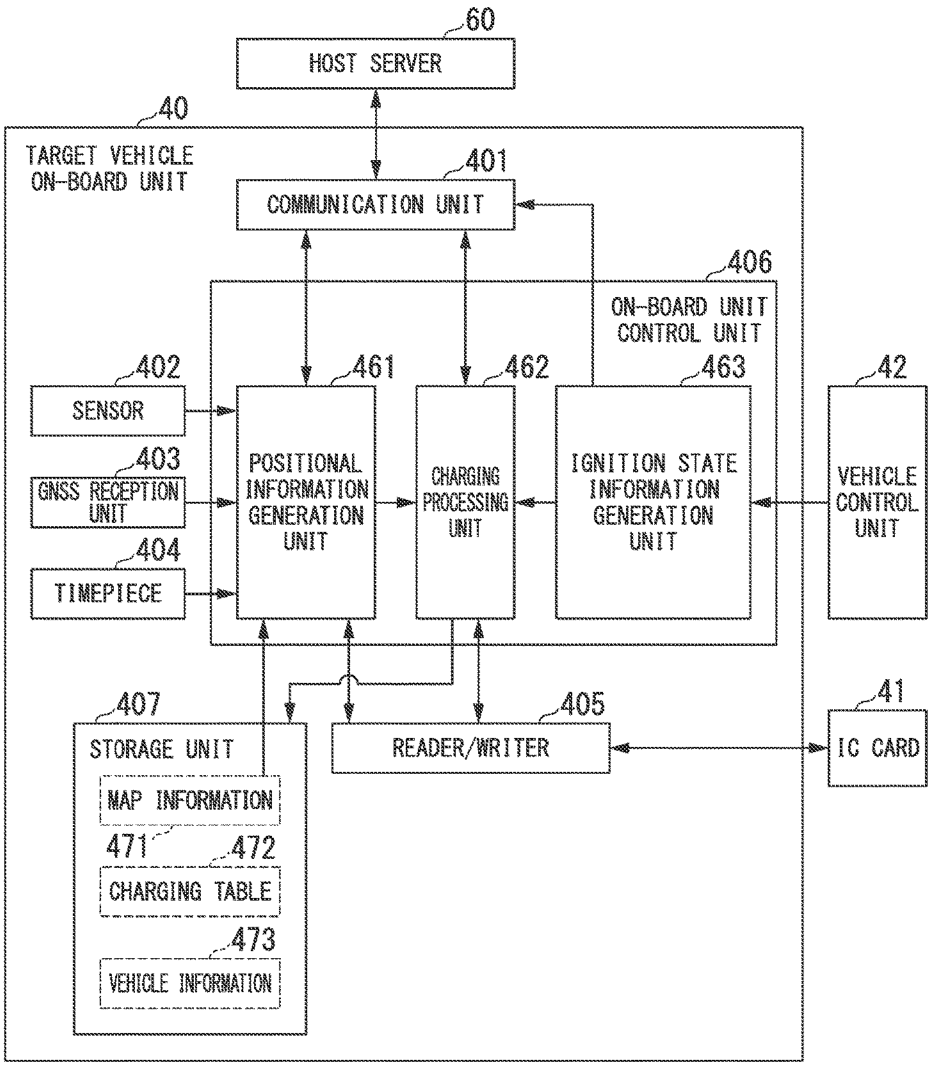
FIG. 4 is a diagram illustrating an example of a configuration of a target vehicle on-board unit 40.

The configuration of the target vehicle on-board unit 40 will be described below in detail with reference to FIG. 4. FIG. 4 is a diagram illustrating an example of the configuration of the target vehicle on-board unit 40.

As illustrated in FIG. 4, the target vehicle on-board unit 40 includes a communication unit 401, a sensor 402, a GNSS reception unit 403, a timepiece 404, a reader/writer 405, an on-board unit control unit 406, and a storage unit 407.

The communication unit 401 transmits the positional information indicating the current position of the target vehicle on-board unit 40, the information on charging acquired by the charging processing, ignition state information, and the like to the host server 60 via a wide area network such as the Internet.

The sensor 402 includes an acceleration sensor, a vehicle speed sensor, and a gyro sensor, detects a state change of the target vehicle 400 on which the target vehicle on-board unit 40 is mounted, and outputs the detection result to the on-board unit control unit 406.

The GNSS reception unit 403 receives radio waves from satellites and outputs information extracted from the radio waves to the on-board unit control unit 406.

The timepiece 404 outputs information indicating a current date and time (hereinafter referred to as date and time information) to the on-board unit control unit 406.

The reader/writer 405 accesses an IC card 41 and reads and writes information therefrom and thereto.

The on-board unit control unit 406 is, for example, a CPU and comprehensively controls the target vehicle on-board unit 40. The target vehicle on-board unit 40 includes a positional information generation unit 461, a charging processing unit 462, and an ignition state information generation unit 463 as functional units which function by causing the on-board unit control unit 406 as the CPU to execute a program. Some or all of the functional units may be hardware functional units such as an LSI or an ASIC.

The positional information generation unit 461 calculates a current position (for example, coordinate values on the Earth) of the target vehicle 400 on which the target vehicle on-board unit 40 is mounted on the basis of information from the sensor 402 or the GNSS reception unit 403 and captures a traveling position thereof. The positional information generation unit 461 captures a link ID of a road on which the vehicle is travelling, for example, by combining the current position of the vehicle with the map information 471 stored in the storage unit 407. The map information 471 includes link IDs for identifying roads. The links may be connected at a node corresponding to an intersection or the like, and the map information 471 includes node IDs for identifying nodes.

The positional information generation unit 461 controls the reader/writer 405 to writes information indicating the captured traveling position and a date and time at which the vehicle is traveling at the traveling position (hereinafter referred to as positional information) to the IC card 41. In the embodiment, the positional information is information in which the captured link ID and the traveling date and time are correlated with each other. An interval at which the link ID is captured is determined in advance. The positional information generation unit 461 outputs the acquired positional information to the charging processing unit 462.

The charging processing unit 462 determines whether communication with the IC card 41 is possible via the reader/writer 405. When communication with the IC card 41 is not possible, for example, when the IC card 41 is not correctly inserted into a predetermined slot, the charging processing unit 462 generates violation information indicating that the IC card 41 is not installed (for example, a no-card violation) and transmits the generated violation information to the host server 60 via the communication unit 401.

The charging processing unit 462 performs charging processing for collecting a toll based on a charging condition defined in a charging table 472 with reference to the charging table 472 and vehicle information 473 stored in the storage unit 407. The charging table 472 is a table indicating a predetermined charging condition or toll corresponding to a charging point or a charging area. The charging table 472 is updated, for example, by the host server 60. The vehicle information 473 is information indicating the vehicle number or a vehicle model of the target vehicle 400.

The charging processing unit 462 determines whether the target vehicle on-board unit 40 has passed through a charging point or a charging area on the basis of the positional information input from the positional information generation unit 461. When the target vehicle on-board unit is determined to have passed through a charging point or a charging area, the charging processing unit 462 calculates a toll with reference to the charging table and settles the calculated toll on the basis of the information stored in the IC card 41.

The charging processing unit 462 performs charging processing on the basis of the ignition state information generated by the ignition state information generation unit 463. For example, in a case of a charging type in which a toll corresponding to a distance accumulated up to a time at which an ignition is turned off in the same charging area is charged, the charging processing unit 462 calculates a toll with reference to the charging table 472 and settles the calculated toll on the basis of the information stored in the IC card 41 when ignition OFF information is input from the ignition state information generation unit 463.

The charging processing unit 462 generates information on charging on the basis of the result of the charging processing, correlates the generated information on charging with vehicle information (such as the vehicle number or vehicle model information), a charging date and time, and the positional information, and transmits the correlated information to the host server 60 via the communication unit 401. When the toll can be settled, the charging processing unit 462 generates information indicating that the toll can be settled. When the toll cannot be settled, such as when electronic money stored in the IC card is insufficient for the toll or when the IC card 41 is not inserted, the charging processing unit 462 generates information indicating that the toll cannot be settled.

The charging processing unit 462 may perform the toll charging processing using the electronic money stored in the IC card 41 or may request an external server of a credit card company or the like to perform the charging processing using vehicle information stored in the IC card 41.

The calculation of the toll may be performed by the host server 60 on the basis of the positional information received from the target vehicle on-board unit 40. In this case, the charging processing by the charging processing unit 462 may be a process of subtracting the toll calculated by the host server 60 from the electronic money stored in the IC card.

The ignition state information generation unit 463 determines whether the ignition state is an ON state or an OFF state on the basis of an output signal of a vehicle control unit 42. In the embodiment, when the output signal of the vehicle control unit 423 is at a high level, the ignition state information generation unit 463 determines that the ignition state is the ON state. When the output signal of the vehicle control unit 423 is at a low level, the ignition state information generation unit 463 determines that the ignition state is the OFF state. In the embodiment, the ignition state information generation unit 463 correlates the vehicle information (such as the vehicle number or the vehicle model information) with ignition ON information indicating that the ignition state is the ON state or the ignition OFF information indicating that the ignition state is the OFF state and periodically transmits the correlated information to the host server 60.

When the target vehicle on-board unit 40 is detached or when the target vehicle on-board unit 40 is powered off, the ignition state information generation unit 463 may correlate the vehicle information (such as the vehicle number or the vehicle model information) with the ignition OFF information and transmit the correlated information to the host server 60.

The IC card 41 stores personal information or electronic money information required for the charging processing and stores charging result information or positional information which is written by the charging processing unit 462 or the positional information generation unit 461.

The vehicle control unit 42 is a CPU which is mounted on the target vehicle 400 and is a control unit that controls a start and end of an engine of the target vehicle 400 on the basis of an operation of turning-on or turning-off the ignition of the target vehicle 400.

(Configuration of Host Server 60)

Figure 5:
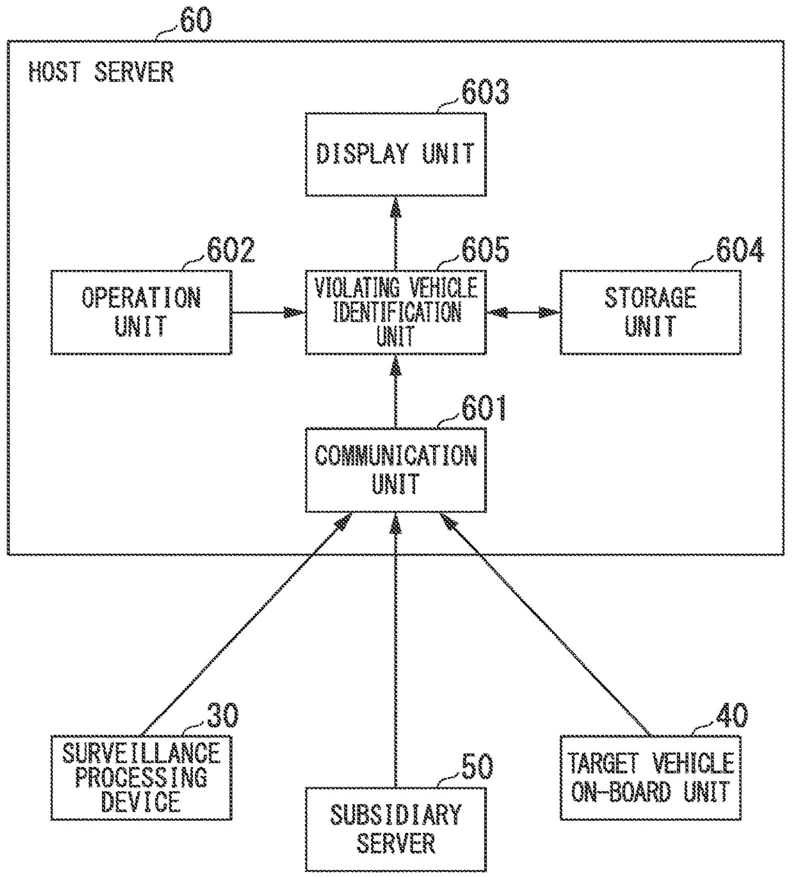
FIG. 5 is a diagram illustrating an example of a configuration of a host server 60.

The configuration of the host server 60 will be described below in detail with reference to FIG. 5. FIG. 5 is a diagram illustrating an example of the configuration of the host server 60.

As illustrated in FIG. 5, the host server 60 includes a communication unit 601, an operation unit 602, a display unit 603, a storage unit 604, and a violating vehicle identification unit 605.

The communication unit 601 is connected to the surveillance processing device 30 and the target vehicle on-board unit 40 via the Internet or the like. The communication unit 601 receives surveillance information from the surveillance processing device 30 and receives the information on charging or the ignition state information from the target vehicle on-board unit 40.

The communication unit 601 is connected to the subsidiary server 50 and receives image data acquired by the camera 20 from the subsidiary server 50.

The operation unit 602 is, for example, a touch panel, a keyboard, or a mouse, receives an operation from an operator, and outputs the received operation to the violating vehicle identification unit 605.

The display unit 603 is, for example, a liquid crystal display and displays a processing result by the violating vehicle identification unit 605 or the like.

The storage unit 604 stores the surveillance information received from the surveillance processing device 30, the information on charging, or the ignition state information received from the target vehicle on-board unit 40, and the image data received from the subsidiary server 50.

The violating vehicle identification unit 605 identifies a violating vehicle on the basis of the surveillance information from the surveillance processing device 30 and the information on charging from the target vehicle on-board unit 40. In the embodiment, the violating vehicle identification unit 605 may identify a violating vehicle on the basis of the surveillance information from the surveillance processing device 30 and the ignition state information or the violation information from the target vehicle on-board unit 40. The violating vehicle identification unit 605 may be a functional unit which functions, for example, by causing a CPU, an LSI, or an ASIC to execute a program.

The violating vehicle identification unit 605 may perform violation processing of determining whether the target vehicle on-board unit 40 photographed by the camera 20 is a violating vehicle at a timing at which the surveillance information is received from the surveillance processing device 30. The violating vehicle identification unit 605 may perform violating processing of determining whether the target vehicle on-board unit 40 that transmitted the information is a violating vehicle at a timing at which the ignition state information, the information on charging, the violation information, and the like are received from the target vehicle on-board unit 40.

Figure 6:
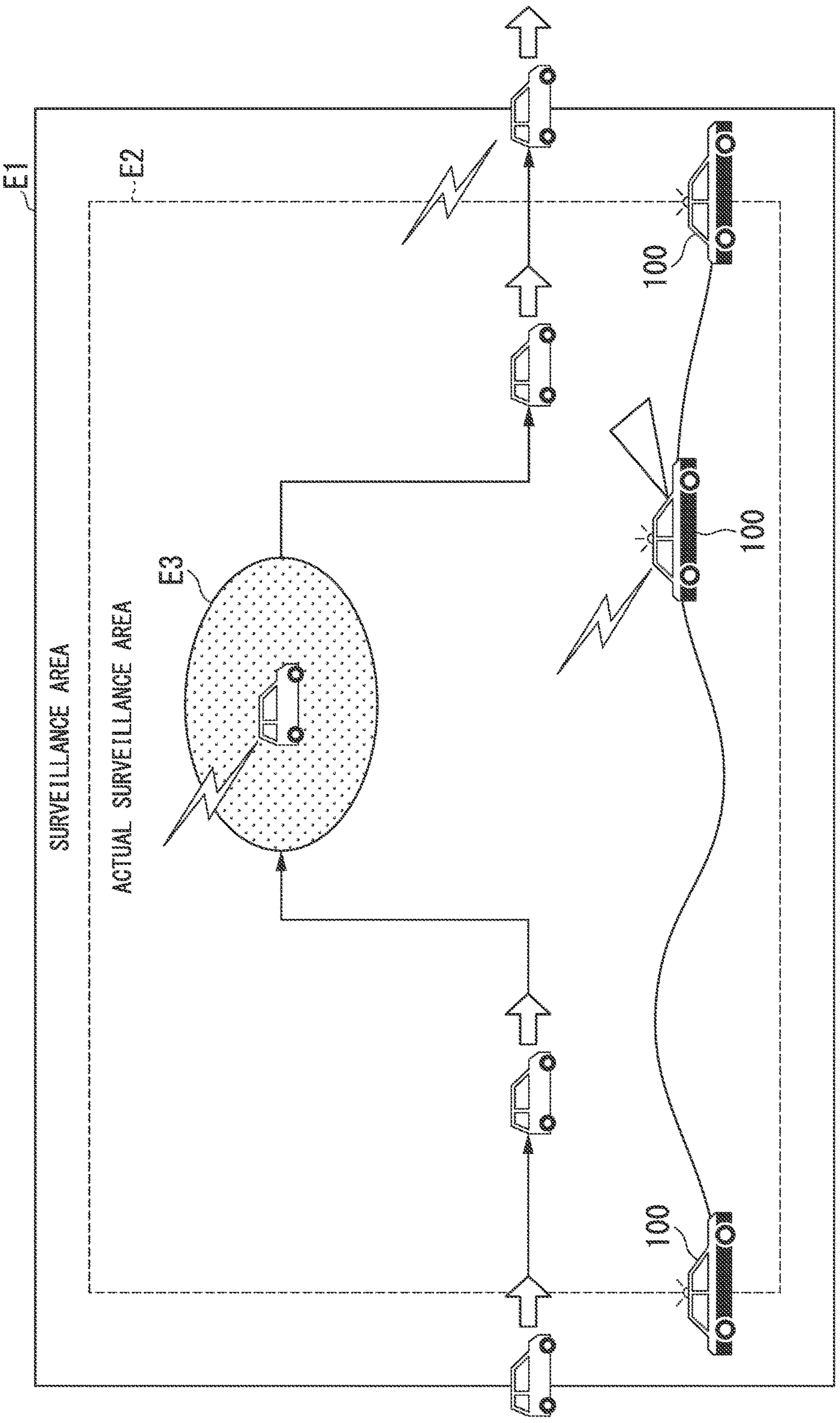
FIG. 6 is a diagram illustrating an example in which a surveillance vehicle 100 and a target vehicle 400 move.

Movement of the surveillance vehicle 100 and the target vehicle 400 in a charging type of the segment charging will be described below with reference to FIG. 6. FIG. 6 is a diagram illustrating an example in which the surveillance vehicle 100 and the target vehicle 400 move.

As illustrated in FIG. 6, an actual surveillance area E2 is defined in a surveillance area E1. The actual surveillance area E2 is an area which is located a predetermined quantity inward from a boundary part of the surveillance area E1. The predetermined quantity may be a predetermined distance or a predetermined moving time.

The surveillance vehicle 100 generates current positional information and transmits the generated current positional information to the host server 60 while traveling. It is assumed that the surveillance vehicle travels from outside the surveillance area E1 toward the surveillance area E1 and enters the surveillance area E1. When the surveillance vehicle moves the predetermined distance or the predetermined time inward in the surveillance area E1 after entering the surveillance area E1, that is, when the surveillance vehicle reaches the actual surveillance area E2, the surveillance processing device 30 starts surveillance processing. In the embodiment, the surveillance processing device 30 instructs the camera 20 to start photographing.

On the other hand, it is assumed that the target vehicle 400 enters the surveillance area E1, travels as it was, and then stops in a parking area E3 in the surveillance area E1. Here, the target vehicle 400 turns off its ignition, turns on the ignition after a predetermined time passes, exits the parking area E3, travels in the surveillance area E1, and then exits the surveillance area E1.

In the embodiment, a toll (Tx1) from a time at which the target vehicle enters the surveillance area E1 to a time at which its ignition is turned off in the parking area E3 is charged to the target vehicle 400. A toll (Tx2) from a time at which the ignition is turned on in the parking area E3 to a time at which the target vehicle exits the surveillance area E1 is charged to the target vehicle 400. Tx1 is charged when the ignition is turned off in the parking area E3, and information in which information on charging is correlated with vehicle information, a charging date and time, and positional information is transmitted to the host server 60. Tx2 is charged when the target vehicle exits the surveillance area E1, and information in which information on charging is correlated with the vehicle information, a charging date and time, and positional information is transmitted to the host server 60.

The camera 20 installed in the surveillance vehicle 100 photographs the target vehicle 400 which exits the parking area E3 and travels in the surveillance area E1. The surveillance processing device 30 generates surveillance information on the basis of the image taken by the camera 20 and transmits the surveillance information to the host server 60.

When the surveillance vehicle 100 exits the actual surveillance area E2, that is, when the surveillance vehicle arrives at a position separated a predetermined distance or a predetermined time from the boundary part of the surveillance area E1, the surveillance processing device 30 ends the surveillance processing. In the embodiment, the surveillance processing device 30 instructs the camera 20 to end the photographing.

Figure 7:
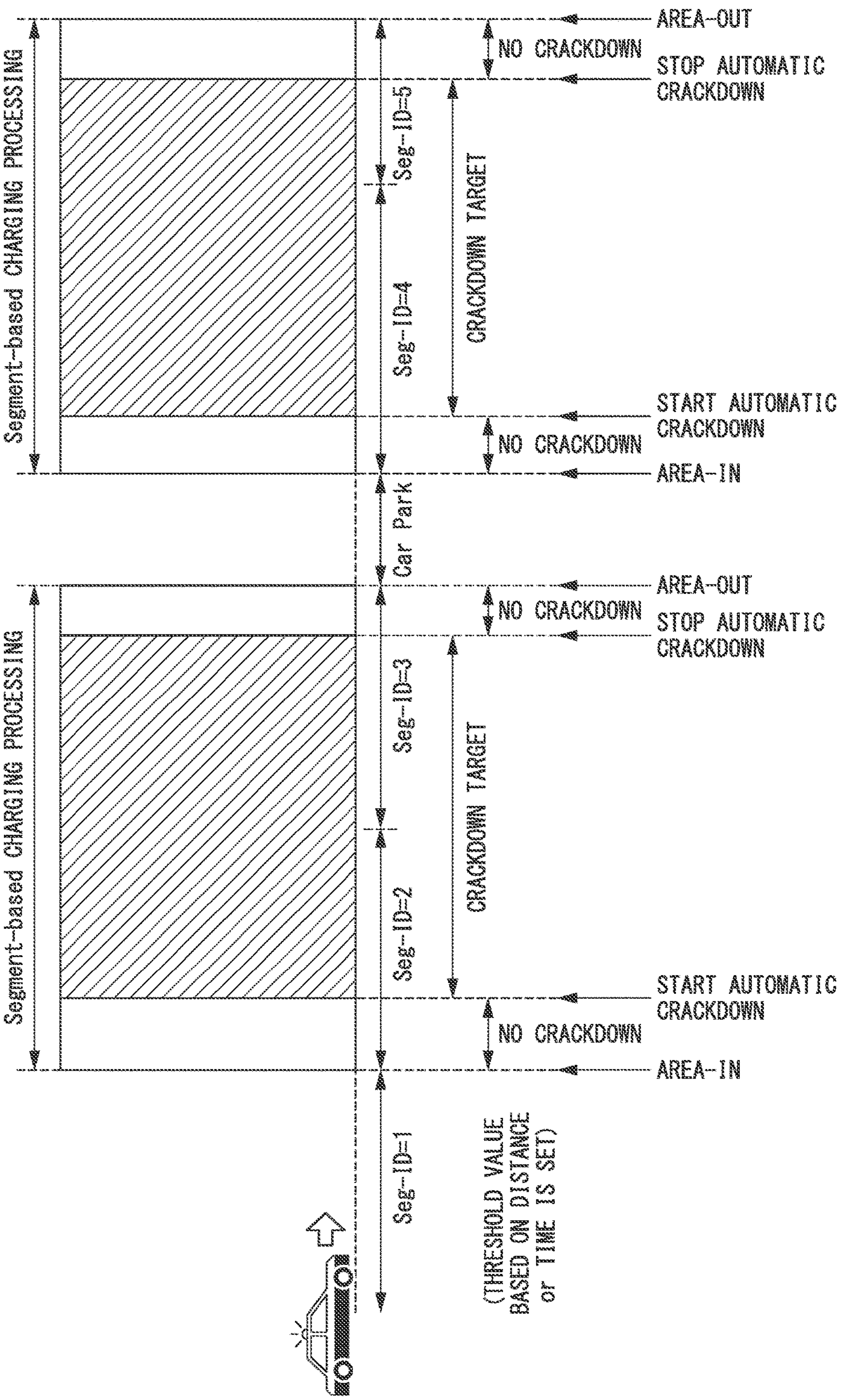
FIG. 7 is a diagram illustrating an example of a surveillance timing of a moving surveillance processing device 30 in segment charging.

Surveillance timing of the moving surveillance processing device 30 in the segment charging will be described below with reference to FIG. 7. FIG. 7 is a diagram illustrating an example of the surveillance timing of the moving surveillance processing device 30 in the segment charging.

As illustrated in FIG. 7, the surveillance vehicle 100 travels in the order of segment IDs 1, 2, 3, 4, and 5. Segment IDs 1 and 2 indicate charging areas and segment IDs 3 and 4 indicate charging areas. A parking area is present between the segments indicated by segment IDs 3 and 4.

The surveillance vehicle 100 enters a charging area when the surveillance vehicle moves from segment ID 1 to segment ID 2 or when the surveillance vehicle moves from the parking area to segment ID 3. Here, the surveillance processing device 30 does not perform the surveillance processing immediately, but starts the surveillance processing after a predetermined distance or a predetermined time passes.

It is predicted that the surveillance vehicle 100 will exit from the charging area soon when the surveillance vehicle moves close to a boundary part of segment ID 3 or a boundary part of segment ID 5 from the charging area. Here, the surveillance processing device 30 does not end the surveillance processing when the surveillance vehicle exits the charging area, but ends the surveillance processing in a predetermined distance before an exiting time point or a predetermined time before the exiting time point.

(Entire Processing Flow)

Figure 8:
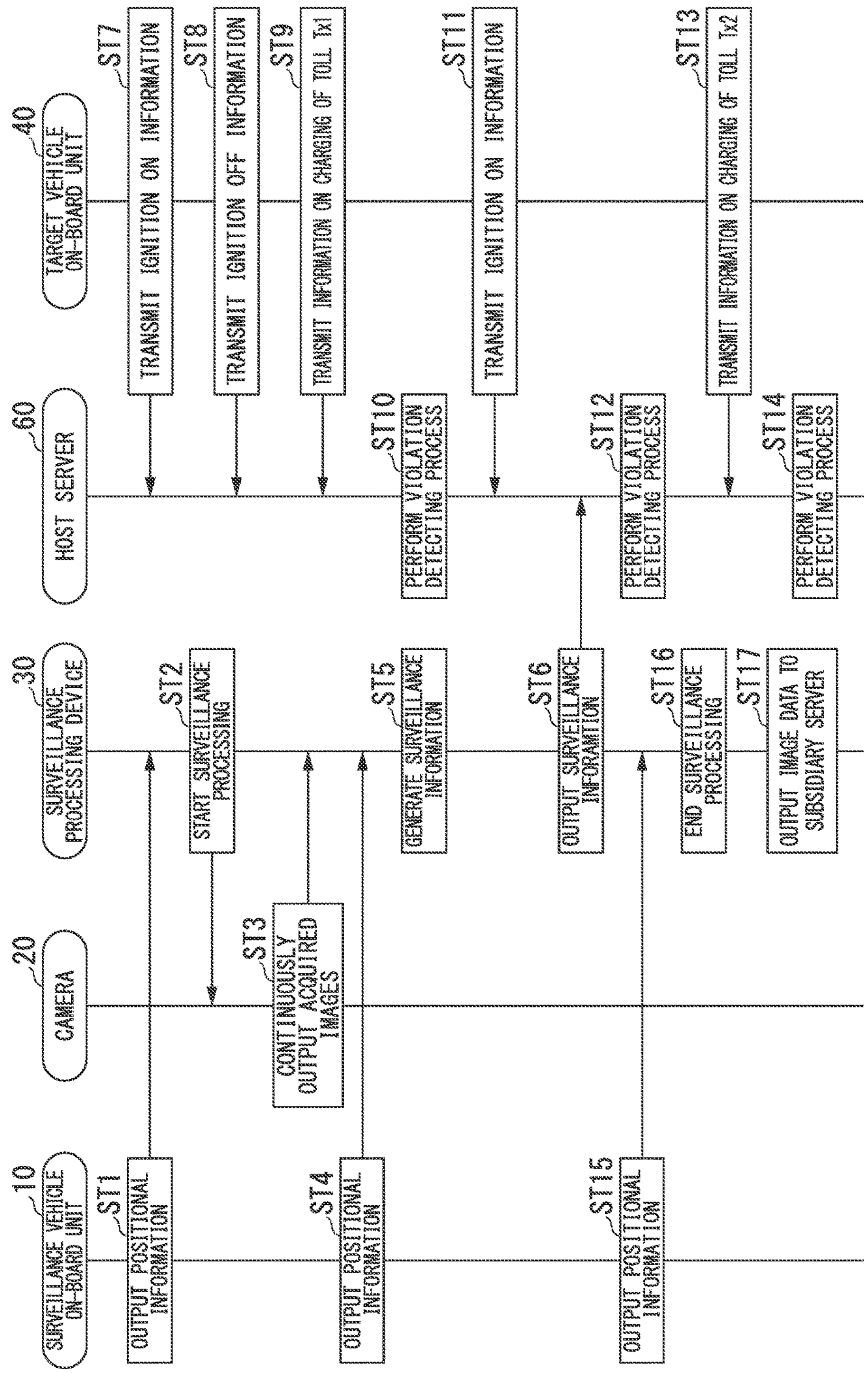
FIG. 8 is a sequence diagram illustrating a whole processing flow of the vehicle surveillance system 1.

The entire processing flow of the vehicle surveillance system 1 will be described below with reference to FIG. 8. FIG. 8 is a sequence diagram illustrating the entire processing flow of the vehicle surveillance system 1.

The surveillance vehicle on-board unit 10 generates positional information indicating a current position of the surveillance vehicle 100 and continuously outputs the generated positional information to the surveillance processing device 30 (Step ST1).

The surveillance processing device 30 starts surveillance processing on the basis of the positional information, a current time, and a schedule table from the surveillance vehicle on-board unit 10 (Step ST2). In the segment charging, when a predetermined distance or a predetermined time passes after the surveillance vehicle reaches a surveillance area, the surveillance processing device 30 starts the surveillance processing. The surveillance processing device 30 instructs the camera 20 to start photographing.

The camera 20 continuously outputs captured images to the surveillance processing device 30 (Step ST3). Newest positional information is input to the surveillance processing device 30 from the surveillance vehicle on-board unit 10 (Step ST4).

The surveillance processing device 30 generates surveillance information on the basis of the image from the camera 20 and the newest positional information (Step ST5) and outputs the generated surveillance information to the host server 60 (Step ST6).

On the other hand, when an ignition of a target vehicle is turned ON, the target vehicle on-board unit 40 transmits ignition ON information to the host server 60 (Step ST7). The target vehicle 400 to which the target vehicle on-board unit 40 is attached is assumed to travel as illustrated in FIG. 6 and enter the surveillance area (that is, a charging area) E1.

Thereafter, when the ignition is turned off in a parking area, the target vehicle on-board unit 40 transmits an ignition OFF signal to the host server 60 (Step ST8).

Accordingly, the target vehicle on-board unit 40 performs charging processing and transmits information in which information on charging of the toll Tx1 is correlated with vehicle information, a charging date and time, and positional information to the host server 60 (Step ST9).

When the information on charging or the like is received from the target vehicle on-board unit 40, the host server 60 performs a violation detecting process (Step ST10).

Thereafter, when the ignition is turned on in the parking area, the target vehicle on-board unit 40 transmits the ignition ON information to the host server 60 (Step ST11).

When ignition state information is received from the target vehicle on-board unit 40, the host server 60 performs the violation detecting process (Step ST12).

Then, the target vehicle on-board unit 40 is assumed to exit the surveillance area (that is, the charging area) E1. The target vehicle on-board unit 40 performs the charging processing and transmits information in which information on charging of the toll Tx2 is correlated with the vehicle information, the charging date and time, and the positional information to the host server 60 (Step ST13).

When the information on charging or the like is received from the target vehicle on-board unit 40, the host server 60 performs the violation detecting process (Step ST14).

The surveillance processing device 30 receives newest positional information from the surveillance vehicle on-board unit 10 (Step ST15) and ends the surveillance processing on the basis of the newest positional information, a schedule data, and a current time (Step ST16). In the segment charging, when the surveillance vehicle arrives at a position separated a predetermined distance or a predetermined time before the surveillance area, the surveillance processing device 30 ends the surveillance processing. The surveillance processing device 30 instructs the camera 20 to end the photographing.

The surveillance processing device 30 outputs image data input from the camera 20 in the surveillance processing to the subsidiary server 50 (Step ST17).

(Processing Flow of Surveillance Vehicle On-Board Unit 10)

Figure 9:
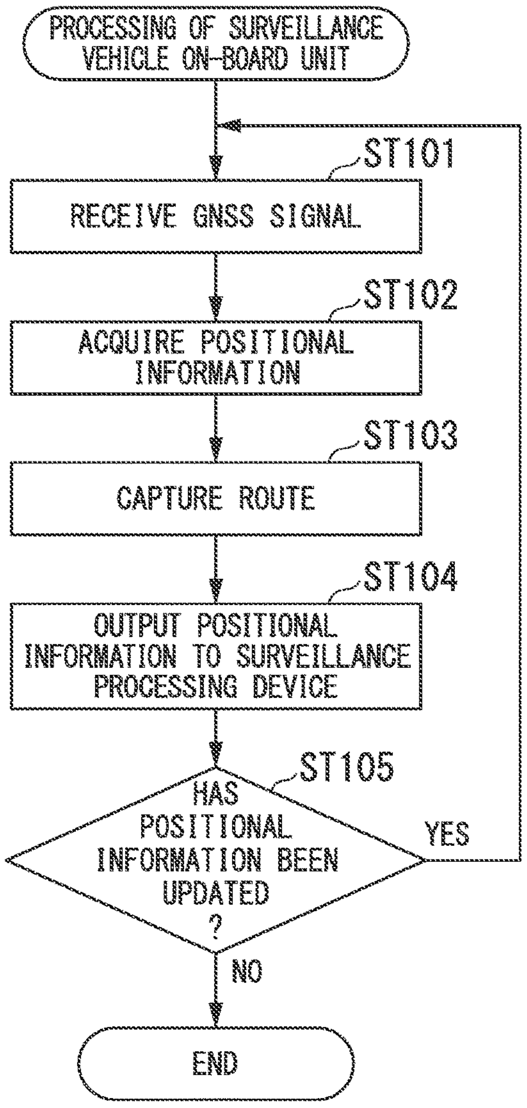
FIG. 9 is a flowchart illustrating an example of a processing flow of the surveillance vehicle on-board unit 10.

The processing flow of the surveillance vehicle on-board unit 10 will be described below with reference to FIG. 9. FIG. 9 is a flowchart illustrating an example of the processing flow of the surveillance vehicle on-board unit 10.

The GNSS reception unit 103 receives radio waves from satellites (Step ST101) and outputs information extracted from the radio waves to the on-board unit control unit 106.

The positional information generation unit 161 acquires a current position (for example, coordinate values on the Earth) of the surveillance vehicle on-board unit 10 (that is, the surveillance vehicle 100) on the basis of the information from the sensor 102 or the GNSS reception unit 103 (Step ST102).

The positional information generation unit 161 captures a link ID of a road on which the surveillance vehicle 100 is travelling, for example, by combining the current position of the surveillance vehicle 100 with the map information 151 stored in the storage unit 105 (Step ST103).

The positional information generation unit 161 generates positional information in which the captured link ID is correlated with information indicating a date and time of the traveling and outputs the generated positional information to the surveillance processing device 30 (Step ST104).

Thereafter, when the positional information is to be updated (YES in Step ST105), the surveillance vehicle on-board unit 10 updates the positional information in Step ST101 again. The surveillance vehicle on-board unit 10 updates the positional information, for example, after a predetermined time passes or after the surveillance vehicle moves a predetermined distance.

When the positional information is not to be updated (NO in Step ST105), for example, when the surveillance vehicle on-board unit 10 is powered off, the processing flow ends.

(Processing Flow of Surveillance Processing Device 30)

Figure 10:
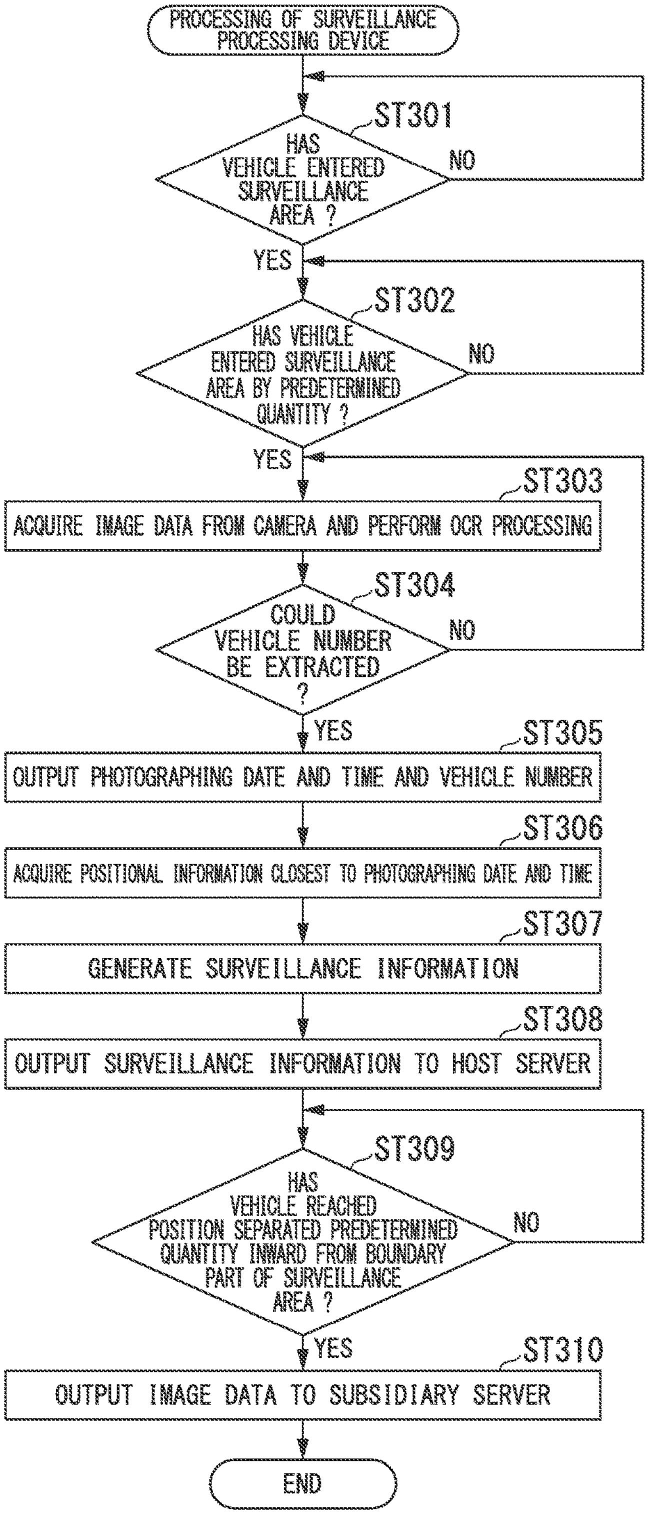
FIG. 10 is a flowchart illustrating an example of a processing flow of the surveillance processing device 30.

The processing flow of the surveillance processing device 30 will be described below with reference to FIG. 10. FIG. 10 is a flowchart illustrating an example of the processing flow of the surveillance processing device 30. Here, an example in which segment charging is selected and the surveillance vehicle 100 performs surveillance while traveling will be described.

The surveillance timing control unit 302 of the surveillance processing device 30 determines whether the surveillance vehicle 100 has entered a surveillance area on the basis of positional information from the surveillance vehicle on-board unit 10 (Step ST301).

When it is determined that the surveillance vehicle 100 enters the surveillance area (YES in Step ST301), the surveillance timing control unit 302 determines whether the surveillance vehicle has moved a predetermined quantity inward in the surveillance area E1 (Step ST302). In the embodiment, the surveillance timing control unit 302 determines whether the surveillance vehicle has moved a predetermined distance or a predetermined time passes after it is determined that the surveillance vehicle has entered the surveillance area.

When it is determined that the surveillance vehicle has moved the predetermined quantity in the surveillance area E1 (YES in Step ST302), the surveillance timing control unit 302 starts surveillance processing and instructs the camera 20 to start photographing. The vehicle number generation unit 303 performs, for example, an OCR processing on an image captured by the camera 20 (Step ST303).

When a vehicle number is extracted by the OCR processing (YES in Step ST304), the vehicle number generation unit 303 correlates the extracted vehicle number with an image ID of an image from which the vehicle number is extracted and a photographing date and time of the image and outputs the correlated information to the surveillance information generation unit 304 (Step ST305). The vehicle image output unit 306 stores image data from the camera 20 in the storage unit 307 in correlation with the image ID and the photographing date and time.

The surveillance information generation unit 304 acquires positional information that is correlated with a date and time closest to the photographing date and time of the positional information from the positional information acquisition unit 301 on the basis of the photographing date and time of the image input from the vehicle number generation unit 303 (Step ST306).

The surveillance information generation unit 304 generates surveillance information including the vehicle number, an image ID, and the photographing date and time from the vehicle number generation unit 303 and the positional information acquired in Step ST306 (Step ST307) and outputs the generated surveillance information to the host server 60 (Step ST308).

When it is determined that the surveillance vehicle 100 has approached a boundary part of the surveillance area from inside the surveillance area, the surveillance timing control unit 302 determines whether the surveillance vehicle has reached a position separated a predetermined quantity inward from the boundary part of the surveillance area E1 (Step ST309). In the embodiment, the surveillance timing control unit 302 predicts a distance or a time required for moving from the inside of the surveillance area to the boundary part of the surveillance area and determines whether the predicted distance or the predicted time is less than a predetermined value.

When it is determined that the surveillance vehicle reaches a position separated the predetermined quantity inward from the boundary part of the surveillance area E1 (YES in Step ST309), the surveillance processing device 30 ends the surveillance processing and instructs the camera 20 to end the photographing. The vehicle image output unit 306 outputs all of the image data stored in the storage unit 307 to the subsidiary server 50 (Step ST310).

(Processing Flow of Target Vehicle On-Board Unit 40)

Figure 11:
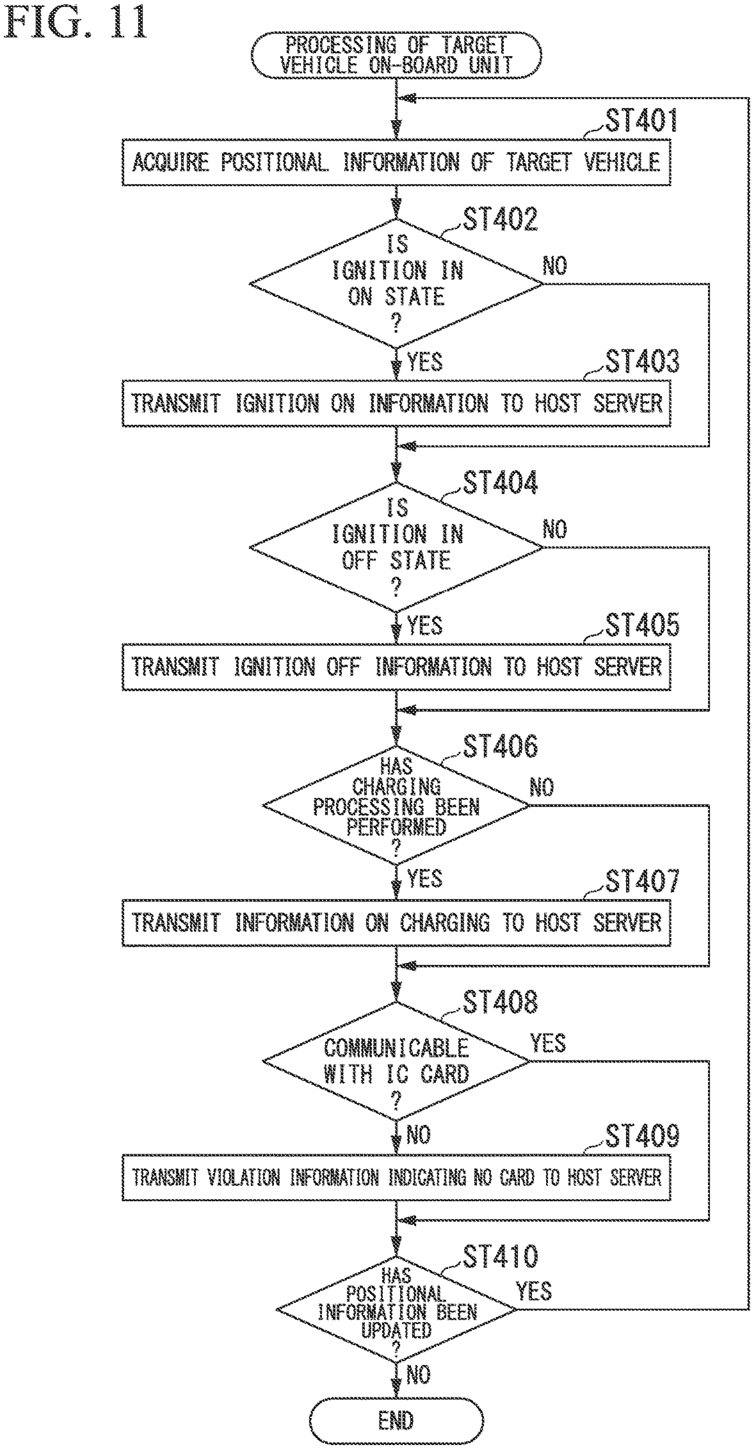
FIG. 11 is a flowchart illustrating an example of a processing flow of the target vehicle on-board unit 40.

The processing flow of the target vehicle on-board unit 40 will be described below with reference to FIG. 11. FIG. 11 is a flowchart illustrating an example of the processing flow of the target vehicle on-board unit 40.

The positional information generation unit 461 of the target vehicle on-board unit 40 generates positional information indicating a current position of the target vehicle 400 (Step ST401).

The ignition state information generation unit 463 determines whether an ignition state is an ON state on the basis of an output signal of the vehicle control unit 42 (Step ST402).

When the output signal is at a high level or the target vehicle on-board unit 40 is powered on, the ignition state information generation unit determines that the ignition state is the ON state (YES in Step ST402) and the target vehicle on-board unit 40 transmits information in which ignition ON information is correlated with the newest positional information to the host server 60 (Step ST403).

The ignition state information generation unit 463 determines whether the ignition state is an OFF state on the basis of the output signal of the vehicle control unit 42 (Step ST404).

When the output signal is at a low level or the target vehicle on-board unit 40 is powered off, the ignition state information generation unit determines that the ignition state is the OFF state (YES in Step ST404) and the target vehicle on-board unit 40 transmits information in which ignition OFF information is correlated with the newest positional information to the host server 60 (Step ST405).

The charging processing unit 462 determines whether charging processing has been performed (Step ST406).

When it is determined that the charging processing has been performed (YES in Step ST406), the charging processing unit 462 generates information on charging and transmits the newest positional information, vehicle information, and a charging date and time in correlation with each other to the host server 60 (Step ST407).

Subsequently, the charging processing unit 462 determines whether communication with the IC card 41 is possible via the reader/writer 405 (Step ST408).

For example, when a response signal from the IC card 41 is not transmitted, the charging processing unit 462 determines that communication with the IC card 41 is not possible (NO in Step ST408), generates violation information indicating that the IC card 41 is not present (for example, the no-card violation), correlates the violation information with the newest positional information, and transmits the correlated information to the host server 60 (Step ST409).

Thereafter, when the positional information is to be updated (YES in Step ST410), the surveillance vehicle on-board unit 10 updates the positional information in Step ST401. The target vehicle on-board unit 40 updates the positional information, for example, after a predetermined time passes or after the target vehicle moves a predetermined distance.

When the positional information is not to be updated (NO in Step ST410), for example, when the target vehicle on-board unit 40 is powered off, the processing flow ends.

(Processing Flow of Host Sever 60)

Figure 12:
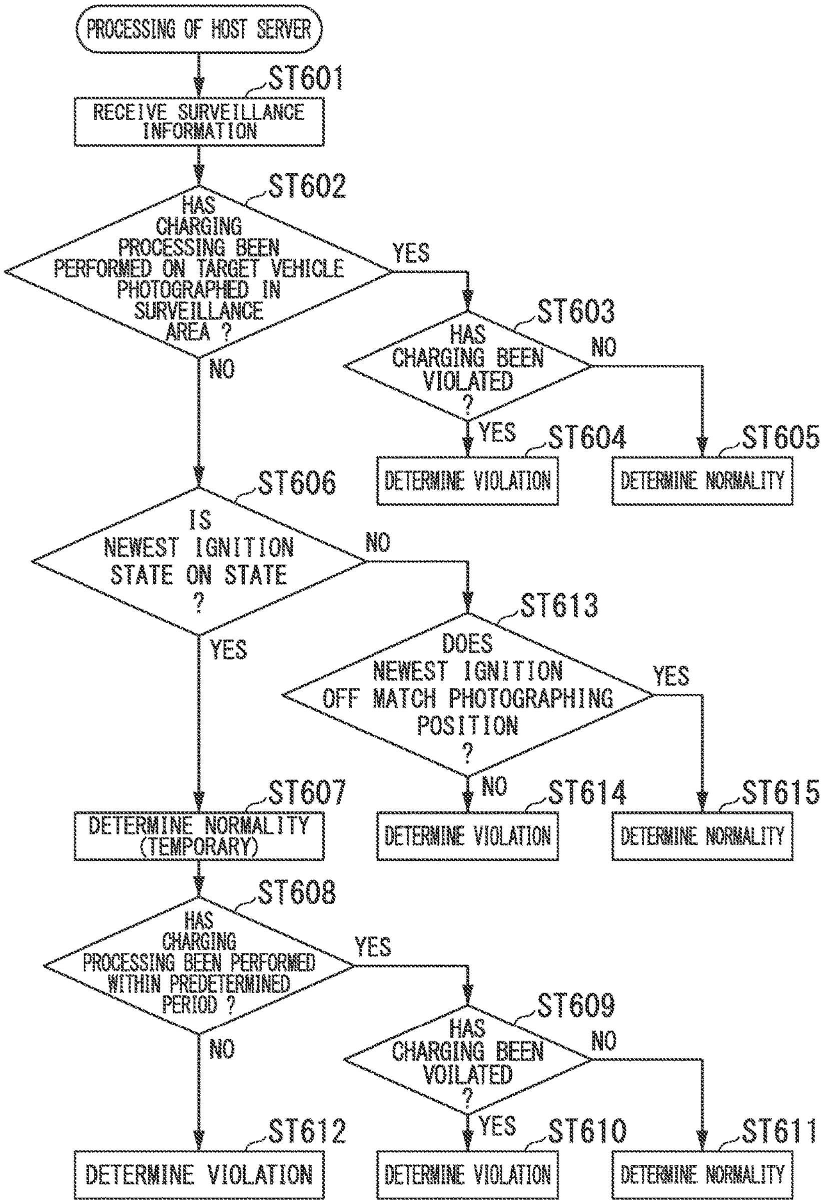
FIG. 12 is a flowchart illustrating an example of a processing flow of the host server 60.

The processing flow of the host server 60 will be described below with reference to FIG. 12. FIG. 12 is a flowchart illustrating an example of the processing flow of the host server 60.

When surveillance information is received from the surveillance processing device 30 (Step ST601), the violating vehicle identification unit 605 determines whether charging processing has been performed in a surveillance area in which the target vehicle 400 is photographed, that is, a surveillance area corresponding to positional information included in the surveillance information (Step ST602).

For example, the violating vehicle identification unit 605 extracts the target vehicle 400 which is present in the surveillance area of the surveillance vehicle 100 on the basis of the positional information included in the surveillance information and newest positional information received from the target vehicle 400. Here, an example in which a single target vehicle 400 is extracted is described for the purpose of simplification of explanation, but when a plurality of target vehicles 400 are extracted, the violating vehicle identification unit 605 may perform the following processing on each of the target vehicles 400.

The violating vehicle identification unit 605 determines whether information correlated with the positional information included in the surveillance area in which the target vehicle 400 is present among information on charging received from the target vehicle on-board unit 40 in the past. When it is determined that the information is present, the violating vehicle identification unit determines whether charging has been violated on the basis of the information on charging correlated with the positional information included in the surveillance area in which the target vehicle 400 is present (Step ST603). Here, the violating vehicle identification unit 605 can retrieve charging processing which has been performed before the surveillance information is acquired in the charging area in which the surveillance information is acquired on the basis of information indicating a photographing date and time included in the surveillance information and information indicating a charging date and time correlated with the information on charging.

For example, as illustrated in FIG. 6, when the surveillance vehicle 100 photographs the target vehicle 400 after the toll Tx1 is charged thereto, charging processing is determined to have been performed in the past in the surveillance area in which the target vehicle 400 is photographed.

Then, when the information on charging is information indicating that charging is not possible, the violating vehicle identification unit 605 determines that the target vehicle has violated the charging (Step ST604).

On the other hand, when the information on charging is information indicating that charging is possible, the violating vehicle identification unit 605 determines that the target vehicle is normal (Step ST605).

When it is determined in Step ST602 that charging was not performed in the past in the surveillance area in which the target vehicle 400 is photographed (NO in Step ST602), the violating vehicle identification unit 605 determines whether the newest ignition state of the target vehicle 400 is an ON state (Step ST606). That is, the violating vehicle identification unit 605 determines whether the target vehicle 400 photographed by the camera 20 is travelling.

When it is determined that the newest ignition state of the target vehicle 400 is the ON state (YES in Step ST606), the violating vehicle identification unit 605 determines that the target vehicle is normal (temporary) (Step ST607). The normal state (temporary) refers to a state which cannot be concluded as being normal but has a high possibility of normality.

The violating vehicle identification unit 605 determines whether charging processing has been performed within a predetermined period (Step ST608). The predetermined period is, for example, 24 hours.

For example, when information on charging is received from the target vehicle 400 within the predetermined time, it is determined that charging processing was performed. A case in which charging processing is performed includes a case in which the target vehicle 400 exits the surveillance area and a case in which the target vehicle 400 turns off an ignition thereof in the surveillance area.

When it is determined that charging processing is performed within the predetermined period (YES in Step ST608), the violating vehicle identification unit 605 determines whether the target vehicle has violated the charging on the basis of information on charging acquired within the predetermined period (Step ST609).

When the information on charging is information indicating that charging is not possible, the violating vehicle identification unit 605 determines that the target vehicle has violated the charging (Step ST610).

On the other hand, when the information on charging is information indicating that charging is possible, the violating vehicle identification unit 605 determines that the target vehicle is normal (Step ST611).

When it is determined in Step ST608 that charging is not performed within the predetermined period (NO in Step ST608), the violating vehicle identification unit 605 determines that the target vehicle has violated the charging (Step ST612). For example, in a case in which the target vehicle on-board unit 40 is detached from the target vehicle 400 during travel or a case in which the IC card 41 is detached from the target vehicle during travel, the target vehicle violating the charging corresponds to the violation mentioned herein.

When it is determined in Step ST606 that the newest ignition state of the target vehicle 400 is not the ON state (NO in Step ST606), the newest ignition state is an OFF state. In this case, the violating vehicle identification unit 605 determines whether a position of the target vehicle 400 when the newest ignition state information was transmitted matches a position at which the camera 20 of the surveillance vehicle 100 photographed the target vehicle 400 (Step ST613). The matching refers to a case in which there is a positional mismatch within a predetermined permissible range as well as a case in which both coordinates are precisely equal to each other.

In the embodiment, when the positional information correlated with the newest ignition OFF information and the positional information included in the surveillance information converge within a predetermined permissible range, the violating vehicle identification unit 605 determines that the position of the target vehicle 400 when the newest ignition state information was transmitted matches the position at which the camera 20 of the surveillance vehicle 100 photographed the target vehicle 400.

When the position of the target vehicle 400 at a time at which the newest ignition state information was transmitted does not match the position at which the camera 20 of the surveillance vehicle 100 photographed the target vehicle 400, the violating vehicle identification unit 605 determines that the target vehicle has violated the charging (Step ST614). For example, a case in which the target vehicle on-board unit 40 is detached after the target vehicle 400 turns off the ignition corresponds to the violation mentioned herein.

On the other hand, when the position of the target vehicle 400 at the time at which the newest ignition state information was transmitted matches the position at which the camera 20 of the surveillance vehicle 100 photographed the target vehicle 400, the violating vehicle identification unit 605 determines that the target vehicle is normal (Step ST615).

Figure 13:
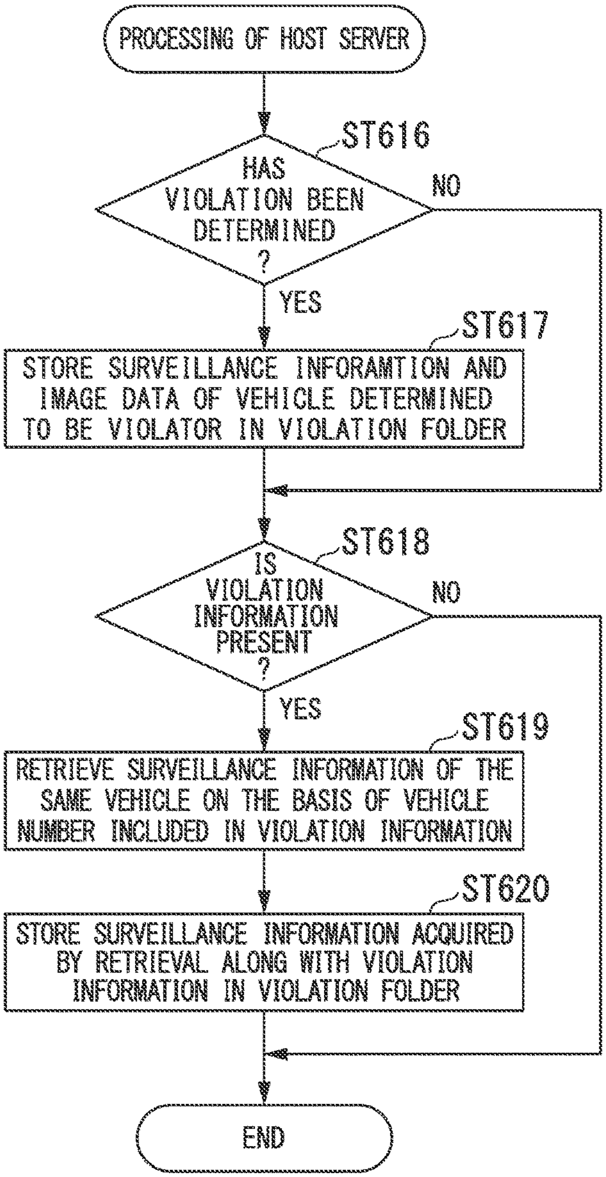
FIG. 13 is a flowchart illustrating an example of another processing flow of the host server 60.

Another processing flow of the host server 60 will be described below with reference to FIG. 13. FIG. 13 is a flowchart illustrating an example of another processing flow of the host server 60.

When it is determined that the target vehicle has violated charging through the processing flow illustrated in FIG. 12 (YES in Step ST616), the violating vehicle identification unit 605 retrieves an image from the subsidiary server 50 on the basis of an image ID included in surveillance information of the target vehicle 400 which is determined to violate the charging. The violating vehicle identification unit 605 stores the image data acquired by the retrieval and the surveillance information in correlation with each other in a violation folder in the storage unit of the host server 60 (Step ST617). Here, the violating vehicle identification unit 605 may display an image of the image data acquired by the retrieval from the subsidiary server 50 on the display unit 603.

The violating vehicle identification unit 605 determines whether violation information has been received from the target vehicle on-board unit 40 (Step ST618). When it is determined that violation information has been received, the violating vehicle identification unit 605 retrieves surveillance information including the same vehicle number on the basis of a vehicle number included in the violation information (Step ST619).

When the surveillance information including the same vehicle number is acquired by the retrieval, the violating vehicle identification unit 605 retrieves an image from the subsidiary server 50 on the basis of an image ID included in the surveillance information acquired by the retrieval. The violating vehicle identification unit 605 stores the image data acquired by the retrieval and the surveillance information in correlation with each other in the violation folder in the storage unit of the host server 60 (Step ST620). Here, the violating vehicle identification unit 605 may display the image of the image data acquired by the retrieval from the subsidiary server 50 on the display unit 603.

(Operations and Effects)

As described above, the vehicle surveillance system 1 according to this embodiment includes a photographing unit (the camera 20), the positional information acquisition unit 301, the surveillance information generation unit 304, and the surveillance information output unit 305 which are attached to a mobile surveillance vehicle, and generates and outputs surveillance information including at least a vehicle number extracted from an image of the target vehicle 400 taken by the camera 20 and positional information acquired by the positional information acquisition unit 301.

According to this configuration, it is possible to photograph the target vehicle 400 at an arbitrary position and to generate the surveillance information. Accordingly, it is possible to increase the number of surveillance points using a single surveillance processing device 30 and to suppress the number of surveillance processing devices 30 which are prepared as a whole.

For example, when point charging is under surveillance, the surveillance processing device 30 can perform surveillance processing at a plurality of charging points for each time period.

When segment charging is under surveillance, the surveillance processing device 30 can perform surveillance processing at a plurality of surveilling points on a travel route by performing the surveillance processing while traveling in a segment that is a charging area.

The vehicle surveillance system 1 according to this embodiment further includes the violating vehicle identification unit 605 that identifies a violating vehicle on the basis of surveillance information from the surveillance processing device 30 and information on charging from the target vehicle on-board unit 40.

According to this configuration, it is possible to crack-down on whether the target vehicle 400 photographed by the camera 20, for example, the target vehicle 400 in a charging area, pays an appropriate fee. It is also possible to crack-down on whether the target vehicle 400 for which an appropriate fee could not be charged is travelling in the charging area.

The violating vehicle identification unit 605 of the vehicle surveillance system 1 according to this embodiment identifies a violating vehicle on the basis of surveillance information including positional information included in an actual surveillance area inside a predetermined charging area among a plurality of pieces of surveillance information.

According to this configuration, it is possible to prevent a vehicle from being erroneously identified as a violating vehicle on the basis of surveillance information acquired from an acquired image in the vicinity of a boundary of a charging area. This is because a vehicle which is not to be charged is also present in the vicinity of the boundary of the charging area and the vehicle which is not to be charged may be photographed by the camera 20. Accordingly, it is possible to prevent a situation in which the vehicle not to be charged is subjected to violation determination and is identified as a violating vehicle.

The violating vehicle identification unit 605 of the vehicle surveillance system 1 according to this embodiment determines that the target vehicle 400 is a violating vehicle when the newest ignition state of the target vehicle 400 is an OFF state and when a position of the target vehicle 400 when an ignition thereof is turned off and a photographing position of the newest image of the target vehicle 400 photographed by the camera 20 do not match each other.

According to this configuration, a target vehicle traveling without broadcasting a turning-on of an ignition thereof after the ignition is turned off can be determined to be a violating vehicle. That is, it is possible to determine the target vehicle 400 traveling with the target vehicle on-board unit 40 detached therefrom to be a violating vehicle.

For example, when the target vehicle 400 turns off the ignition, a position at which the ignition is turned off and the position at which the camera 20 captures the newest image of the target vehicle on-board unit 40 will match each other. This is because when the target vehicle on-board unit 40 is detached after the ignition is turned off and then the target vehicle 400 turns on the ignition and travels, the camera 20 photographs the target vehicle 400 while traveling as the newest image.

The violating vehicle identification unit 605 of the vehicle surveillance system 1 according to this embodiment determines that the target vehicle is a violating vehicle when the newest ignition state of the target vehicle 400 is an ON state and charging processing is not performed within a predetermined period.

According to this configuration, the target vehicle 400 having a high possibility of exiting a charging area without performing charging processing can be determined to be a violating vehicle. That is, the target vehicle 400 which does not perform charging processing using an unknown method and exits from the charging area can be determined to be a violating vehicle.

For example, when the charging processing is not performed within 24 hours, there is a low possibility that the target vehicle will still be present in the charging area. In this way, when a sufficient time, in which it is predicted that the target vehicle will exit from the charging area, passes but the charging processing is not performed thereon, there is a possibility that the target vehicle on-board unit 40 has been forcibly detached or that positional information has been falsified.

The violating vehicle identification unit 605 of the vehicle surveillance system 1 according to this embodiment identifies a violating vehicle on the basis of information on charging of charging processing and surveillance information when the charging processing is performed before surveillance information is acquired in a surveillance area in which the surveillance information is acquired.

According to this configuration, it is possible to determine whether a vehicle, of which the surveillance information is acquired, is a violating vehicle on the basis of the surveillance information acquired after the charging processing is performed. Accordingly, even when a vehicle performing appropriate charging processing becomes a violating vehicle after the charging processing, it is possible to crack-down on the vehicle.

The vehicle surveillance system 1 according to this embodiment further includes the surveillance timing control unit 302 that instructs the camera 20 to start photographing when it is determined that the surveillance vehicle 100 has moved a predetermined quantity or more into a charging area from a boundary part of the charging area and instructs the camera 20 to end photographing when it is determined that the surveillance vehicle 100 in the charging area has approached the boundary part.

According to this configuration, it is possible to prevent the target vehicle 400 from being photographed in the vicinity of the boundary of the charging area. A vehicle not to be charged may be present in the vicinity of the boundary of the charging area and the camera 20 may photographs the vehicle not to be charged. On the other hand, according to this configuration, it is possible to prevent a situation in which the vehicle not to be charged is subjected to violation determination and is erroneously identified as a violating vehicle.

The positional information acquisition unit 301 of the vehicle surveillance system 1 according to this embodiment acquires positional information generated on the basis of signals received from satellites.

According to this configuration, it is possible to simply acquire a current position at which surveillance information is acquired.

The vehicle surveillance system 1 according to this embodiment includes an image ID of an image taken by the camera 20 in surveillance information and stores the image taken by the camera 20 in the subsidiary server 50.

According to this configuration, it is possible to leave photographic evidence indicating that a violating vehicle is present in a charging area.

The vehicle surveillance system 1 according to this embodiment includes the display unit 603 that outputs an image of the target vehicle 400 identified as a violating vehicle taken by the camera 20 when the violating vehicle is identified.

According to this configuration, it is possible to display photographic evidence indicating that the violating vehicle is present in a charging area.

When surveillance information is acquired, the vehicle surveillance system 1 according to this embodiment can identify whether the target vehicle 400 photographed by the camera 20 in a charging area is a violating vehicle on the basis of the surveillance information, information received from the target vehicle 400, and a vehicle number included in the surveillance information.

According to this configuration, it is possible to crack-down on the target vehicle 400 that travels in a charging area with the target vehicle on-board unit 40 detached therefrom.

When violation information is received from the target vehicle 400, the vehicle surveillance system 1 according to this embodiment can acquire an image indicating that the target vehicle 400 has traveled in a charging area on the basis of a vehicle number of the target vehicle 400 included in the received information.

According to this configuration, it is possible to acquire photographic evidence indicating that a violating vehicle in which the IC card 41 is not inserted or a toll cannot be collected due to an insufficient amount of electronic money remaining has traveled in the charging area.

The vehicle surveillance system 1 according to this embodiment includes the display unit 603 that outputs an image of the target vehicle 400 identified as a violating vehicle taken by the camera 20 when the violating vehicle is identified.

According to this configuration, it is possible to display photographic evidence indicating that the violating vehicle has been present in a charging area.

(Addition, Replacement, or Modification of Elements)

In addition, the elements in the above-mentioned embodiments can be substituted with known elements without departing from the gist of the present invention. The technical scope of the present invention is not limited to the above-mentioned embodiment, and the embodiment can be modified in various forms without departing from the gist of the present invention.

The charging type is not limited to the point charging or the segment charging. For example, a charging type in which a specific vehicle can travel with a relatively low cost or fee when the specific vehicle travels on a predetermined public road during a predetermined time period (such as night, early morning, or a holiday) (hereinafter referred to as off-peak car (OPC) charging) may be employed. A private road or a non-public road is not to be charged. Another charging type is applied to times other than the predetermined time period.

Examples of this charging type include a type in which a toll corresponding to traveling distance is charged (hereinafter referred to as distance charging) and a type in which a constant toll is charged when a traveling distance accumulated in a day is equal to or greater than a threshold value (hereinafter referred to as flat charging). In the distance charging, a toll corresponding to distance is charged when an ignition of a target vehicle 400 is turned off.

When the flat charging or the OPC charging is applied, the violating vehicle identification unit 605 calculates a public road travel distance per day of the target vehicle 400 on the basis of positional information acquired from the target vehicle on-board unit 40 when determining whether the target vehicle is a violating vehicle. When the calculated public road travel distance per day is less than a threshold value, the violating vehicle identification unit 605 determines that the target vehicle is normal in spite of not paying a toll. On the other hand, when the calculated public road travel distance per day is equal to or greater than the threshold value, the violating vehicle identification unit 605 determines that the target vehicle is a violating vehicle when a toll is not paid or electronic money remaining is insufficient for the toll.

The subsidiary server 50 may transmit all of the image data to the host server 60. The subsidiary server 50 of the host server 60 may delete a corresponding image when violation determination is performed on the basis of surveillance information and it is determined that the target vehicle is not a violating vehicle. As a result, it is possible to reduce storage capacity.

The surveillance vehicle on-board unit 10 detects a position of the surveillance vehicle 100 (that is, a photographing position of the camera 20) on the basis of signals received from satellites, but the present invention is not limited to this configuration. For example, the surveillance vehicle may stop at a position at which the surveillance vehicle can photograph the target vehicle 400 communicating with a road-side antenna and crack-down on the target vehicle 400. In this case, a photographing position of the camera 20 is an area in which the target vehicle 400 can communicate with the road-side antenna.

Detachment of the target vehicle on-board unit 40 in a charging area may be considered as a violation and the target vehicle on-board unit 40 may transmit violation information indicating the detachment to the host server 60. Accordingly, the violating vehicle identification unit 605 can identify the target vehicle 400 with the target vehicle on-board unit 40 detached therefrom as a violating vehicle.

The violating vehicle identification unit 605 of the host server 60 may check whether a vehicle number of the target vehicle on-board unit 40 is present in surveillance information received from the surveillance processing device 30 on the basis of a vehicle number received from the target vehicle on-board unit 40, and may determine whether the target vehicle on-board unit of the target vehicle 400 is replaced with an on-board unit of another vehicle.

For example, it is assumed that the target vehicle 400 is a large vehicle and the target vehicle on-board unit 40 of an ordinary vehicle is attached to the target vehicle. In this case, it cannot be determined whether charging has been violated using information on charging, but when the target vehicle on-board unit 40 transmits the information on charging, a vehicle number of the ordinary vehicle registered in the target vehicle on-board unit 40 is transmitted to the host server 60. When the target vehicle 400 is photographed by the camera 20, the surveillance processing device 30 includes a vehicle number described on a license plate of the target vehicle 400 instead of the vehicle number transmitted along with the information on charging in the surveillance information and transmits the surveillance information. Accordingly, the vehicle with the vehicle number received from the target vehicle on-board unit 40 and the information on charging is not photographed by the camera 20 in a charging time period.

Therefore, when the information on charging is received from the target vehicle on-board unit 40, the violating vehicle identification unit 605 may search the surveillance information received from the surveillance processing device 30 on the basis of the vehicle number transmitted from the target vehicle on-board unit 40 in correlation with the information on charging and may detect a violation in which the target vehicle on-board unit 40 has been replaced.

A part of the surveillance vehicle on-board unit 10, the camera 20, and the surveillance processing device 30 in the above-mentioned embodiments may be embodied by a computer. In this case, the part may be embodied by recording a program for realizing control functions on a computer-readable recording medium and causing a computer system to read and execute the program recorded on the recording medium. The "computer system" mentioned herein is a computer system built in the surveillance vehicle on-board unit 10, the camera 20, and the surveillance processing device 30 and includes an operating system (OS) or hardware such as peripherals. Examples of the "computer-readable recording medium" include a portable medium such as a flexible disk, a magneto-optical disk, a ROM, or a CD-ROM and a storage device such as a hard disk built into the computer system. The "computer-readable recording medium" may include a medium that dynamically holds a program for a short time like a communication line when the program is transmitted via a network such as the Internet or a communication line such as a telephone circuit or a medium that holds the program for a predetermined time like a volatile memory in a computer system that serves as a server or a client in that case. The program may serve to realize a part of the above-mentioned functions, or may realize the above-mentioned functions in combination with another program stored in advance in the computer system.

All or a part of the surveillance vehicle on-board unit 10, the camera 20, and the surveillance processing device 30 in the above-mentioned embodiment may be embodied by an integrated circuit such as a large scale integration (LSI). Functional blocks of the surveillance vehicle on-board unit 10, the camera 20, and the surveillance processing device 30 may be independently made into individual processors, or all or some thereof may be integrated as a processor. The circuit integrating technique is not limited to the LSI, but a dedicated circuit or a general-purpose processor may be used. When a circuit integrating technique capable of substituting the LSI appears due to the advancement of semiconductor technology, an integrated circuit based on the technique may be used.

REFERENCE SIGNS LIST

1 Vehicle surveillance system
10 Surveillance vehicle on-board unit
20 Camera
30 Surveillance processing device
40 Target vehicle on-board unit
50 Subsidiary server
60 Host server
101 Communication unit
102 Sensor
103 GNSS reception unit
104 Timepiece
105 Storage unit
106 On-board unit control unit
151 Map information
161 Positional information generation unit
301 Positional information acquisition unit
302 Surveillance timing control unit
303 Vehicle number generation unit
304 Surveillance information generating unit
305 Surveillance information output unit
306 Vehicle image output unit
307 Storage unit
401 Communication unit
402 Sensor
403 GNSS reception unit
404 Timepiece
405 Reader/writer
406 On-board unit control unit
461 Positional information generation unit
462 Charging processing unit
463 Ignition state information generation unit
471 Map information
472 Charging table
473 Vehicle information
41 IC card
42 Vehicle control unit
601 Communication unit
602 Operation unit
603 Display unit
604 Storage unit
605 Violating vehicle identification unit

The invention claimed is:

1. A vehicle surveillance system, comprising:

a photographing unit configured to photograph a target vehicle;

a positional information acquisition unit configured to acquire positional information indicating a position of the photographing unit;

a surveillance information generation unit configured to extract a vehicle number from an image acquired by the photographing unit and generate surveillance information on the basis of at least the vehicle number and the positional information;

a surveillance information output unit configured to output the surveillance information generated by the surveillance information generation unit; and a violating vehicle identification unit configured to identify a violating vehicle on the basis of the surveillance information and information on charging from an on-board unit of the target vehicle, wherein the photographing unit, the positional information acquiring unit, the surveillance information generation unit, and the surveillance information output unit are installed in a mobile surveillance vehicle, wherein the positional information acquisition unit is configured to acquire the positional information of the mobile surveillance vehicle, and wherein the violating vehicle identification unit determines that the target vehicle is the violating vehicle, in a newest ignition state of the target vehicle is an OFF state, when a position of the target vehicle when the ignition state is switched to the OFF state and a position of the target vehicle included in a newest surveillance information do not match each other.

2. The vehicle surveillance system according to claim 1, wherein the violating vehicle identification unit identifies the violating vehicle on the basis of surveillance information including positional information which is included in an actual surveillance area inside a predetermined charging area among multiple pieces of the surveillance information.

3. The vehicle surveillance system according to claim 1, wherein the violating vehicle identification unit determines that the target vehicle is the violating vehicle when the newest ignition state of the target vehicle is an ON state and charging processing has not been performed within a predetermined period.

4. The vehicle surveillance system according to claim 1, wherein the violating vehicle identification unit identifies the violating vehicle on the basis of information on charging of the charging processing and the surveillance information when the charging processing is performed before acquiring the surveillance information in a charging area in which the surveillance information is acquired.

5. The vehicle surveillance system according to claim 1, further comprising a surveillance timing control unit configured to:

instruct the photographing unit to start photographing when it is determined that the surveillance vehicle has moved a predetermined distance or more or a predetermined time or more into the predetermined charging area from a boundary part of the charging area on the basis of the positional information; and instruct the photographing unit to end photographing when it is determined that the surveillance vehicle in the charging area has approached the boundary part on the basis of the positional information.

6. The vehicle surveillance system according to claim 1, wherein the positional information acquisition unit acquires positional information which is generated on the basis of a signal received from a satellite.

7. A vehicle surveillance method which is performed by a vehicle surveillance system installed in a mobile surveillance vehicle, the vehicle surveillance method comprising:

a photographing step of photographing a target vehicle;

a positional information acquisition step of acquiring positional information indicating a position at which the target vehicle is photographed;

a surveillance information generation step of extracting a vehicle number from an image acquired in the photographing step and generating surveillance information on the basis of at least the vehicle number and the positional information;

a surveillance information output step of outputting the surveillance information generated in the surveillance information generation step; and a step of identifying a violating vehicle on the basis of the surveillance information and information on charging from an on-board unit of the target vehicle, wherein the step of identifying the violating vehicle comprises: determining that the target vehicle is the violating vehicle, in a newest ignition state of the target vehicle is an OFF state, when a position of the target vehicle when the ignition state is switched to the OFF state and a position of the target vehicle included in a newest surveillance information do not match each other.

8. A non-transitory computer-readable medium having stored thereon instructions executable by a computing device to cause the computing device to perform method steps, the method steps comprising:

a photographing step of photographing a target vehicle;

a positional information acquisition step of acquiring positional information indicating a position at which the target vehicle is photographed;

a surveillance information generation step of extracting a vehicle number from an image acquired in the photographing step and generating surveillance information on the basis of at least the vehicle number and the positional information;

a surveillance information output step of outputting the surveillance information generated in the surveillance information generation step; and a step of identifying a violating vehicle on the basis of the surveillance information and information on charging from an on-board unit of the target vehicle, wherein the step of identifying the violating vehicle comprises: determining that the target vehicle is the violating vehicle, in a newest ignition state of the target vehicle is an OFF state, when a position of the target vehicle when the ignition state is switched to the OFF state and a position of the target vehicle included in a newest surveillance information do not match each other.

* * * * *